(12) United States Patent
Khatib et al.

(10) Patent No.: US 11,887,211 B2
(45) Date of Patent: Jan. 30, 2024

(54) TEXTURE MAPPING

(71) Applicant: Arm Limited, Cambridge (GB)

(72) Inventors: Khaled Tarek Abdellatif Mohamed Khatib, Trondheim (NO); Åsmund Kvam Oma, Trondheim (NO); Edvard Fielding, Trondheim (NO)

(73) Assignee: Arm Limited, Cambridge (GB)

( * ) Notice: Subject to any disclaimer, the term of this patent is extended or adjusted under 35 U.S.C. 154(b) by 185 days.

(21) Appl. No.: 17/579,831

(22) Filed: Jan. 20, 2022

(65) Prior Publication Data

US 2023/0230197 A1 Jul. 20, 2023

(51) Int. Cl.
*G06T 1/60* (2006.01)
*G06T 1/20* (2006.01)
*G06T 7/40* (2017.01)

(52) U.S. Cl.
CPC ............... *G06T 1/60* (2013.01); *G06T 1/20* (2013.01); *G06T 7/40* (2013.01)

(58) Field of Classification Search
None
See application file for complete search history.

(56) References Cited

U.S. PATENT DOCUMENTS

2002/0060684 A1\* 5/2002 Alcorn ............... G09G 5/393
345/557

\* cited by examiner

*Primary Examiner* — James A Thompson
*Assistant Examiner* — Kim Thanh T Tran
(74) *Attorney, Agent, or Firm* — NIXON & VANDERHYE P.C.

(57) ABSTRACT

A texture cache comprises at least two banks of cache storage to cache texels for processing in texture mapping operations. Access to the cached texels corresponding to a given chunk of texels of a given texture image is controlled according to a selected bank mapping selected from two or more bank mappings supported by the texture cache access control circuitry. Each bank mapping corresponds to a different mapping of the respective texels within the given chunk to the banks of cache storage. In at least one operating mode, the selected bank mapping is selected for the given chunk of texels of the given texture image depending on: at least one of first/second chunk position coordinates associated with the given chunk of texels; and at least one further texture attribute associated with the given texture image.

17 Claims, 15 Drawing Sheets

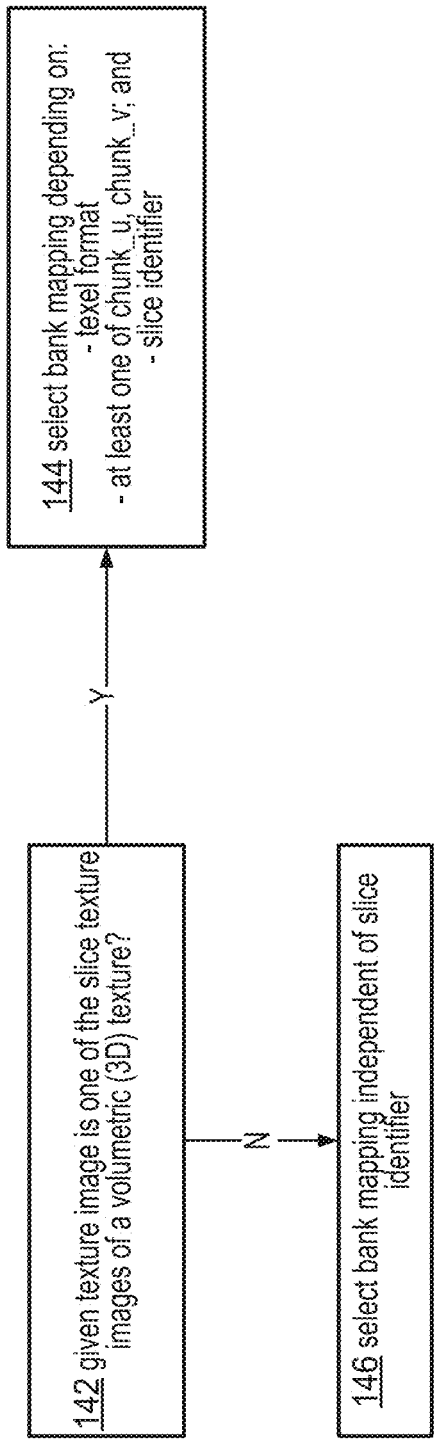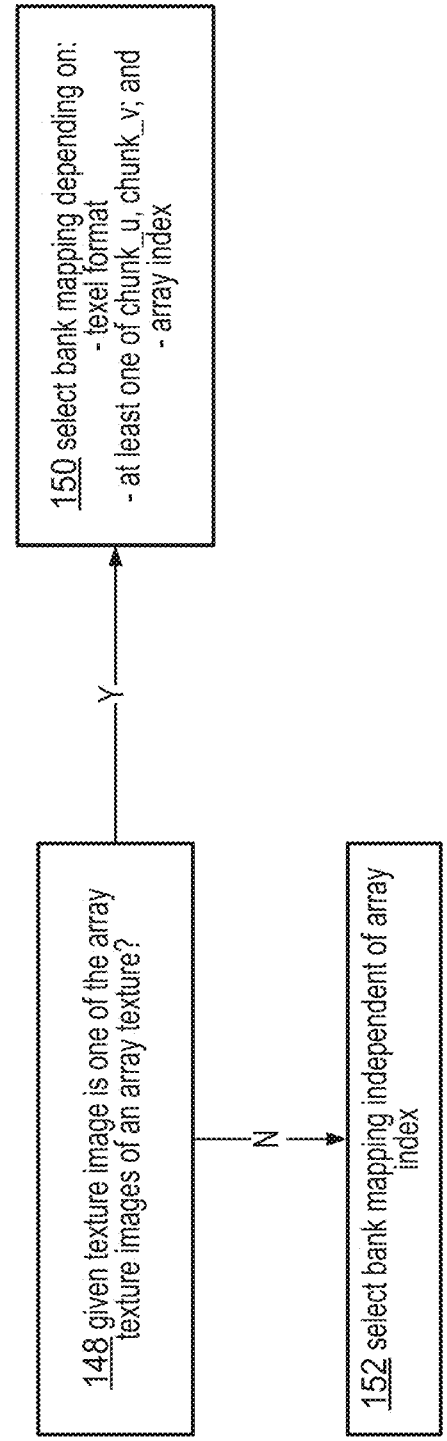
FIG. 17
FIG. 18

TEXTURE MAPPING

BACKGROUND

Technical Field

The present technique relates to the field of texture mapping.

Technical Background

Texture mapping is used in graphics processing to apply a texture onto a surface or object generated for a scene. A textures can be defined using one or more texture images stored in a memory system (it is also possible to define procedural textures using a computational algorithm without storing texture images). A texture defines a set of "texels" (texture data elements) with each texel representing texture data, such as colour, luminance, shadow, etc., to be applied at a corresponding position within the texture. The texels can be defined with respect to texel axes defined relative to the texture itself. The texture mapping operation can determine the sample positions of the scene at which the texture is to be applied and map the texels to corresponding sample positions within the rendered scene, with transformations such as rescaling or warping the texture being applied to account for the size, orientation and shape of the surface to which the texture is being applied. Such texture mapping operations can be useful because it can be less computationally expensive to generate a graphics model which represents larger scale objects with relatively little detail, and then use the texture mapping to add realism, compared to attempting to model the fine detail of the scene using separate objects in the underlying graphics model. For example, when rendering a scene including a brick wall, rather than processing each brick of the wall as a separate primitive represented in the graphics model of the scene, it can be less computationally expensive to model the wall as a surface, and apply a texture image representing the brick pattern of the wall using texture mapping.

SUMMARY

At least some examples of the present technique provide an apparatus comprising: texture mapping circuitry to perform texture mapping operations using texels defined by textures represented using at least one texture image stored in a memory system;
a texture cache comprising a plurality of banks of cache storage to cache texels for processing in the texture mapping operations; and
texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
in at least one operating mode, the texture cache access control circuitry is configured to select the selected bank mapping for the given chunk of texels of the given texture image depending on:
at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
at least one further texture attribute associated with the given texture image.

At least some examples provide a method comprising:
caching texels, defined by textures represented using at least one texture image stored in a memory system, in a texture cache comprising a plurality of banks of cache storage;
for cached texels corresponding to a given chunk of texels of a given texture image, controlling access to the cached texels in the texture cache according to a selected bank mapping selected from among a plurality of bank mappings, each bank mapping corresponding to a different mapping of the respective texels of the given chunk of texels to the plurality of banks of cache storage of the texture cache; and
performing texture mapping operations using cached texels obtained from the texture cache; in which:
in at least one operating mode, the selected bank mapping to use for the given chunk of texels of the given texture image is selected depending on:
at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
at least one further texture attribute associated with the given texture image.

At least some examples provide a non-transitory computer-readable medium to store computer-readable code for fabrication of an apparatus comprising:
texture mapping circuitry to perform texture mapping operations using texels defined by textures represented using at least one texture image stored in a memory system;
a texture cache comprising a plurality of banks of cache storage to cache texels for processing in the texture mapping operations; and
texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
in at least one operating mode, the texture cache access control circuitry is configured to select the selected bank mapping for the given chunk of texels of the given texture image depending on:
at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
at least one further texture attribute associated with the given texture image.

Further aspects, features and advantages of the present technique will be apparent from the following description of examples, which is to be read in conjunction with the accompanying drawings.

BRIEF DESCRIPTION OF THE DRAWINGS

FIGS. 15 to 19 illustrate different examples of using a further texture attribute associated with a given texture image to determine the bank mapping to use for chunk of texels within that given texture image.

DESCRIPTION OF EXAMPLES

Figure 1:
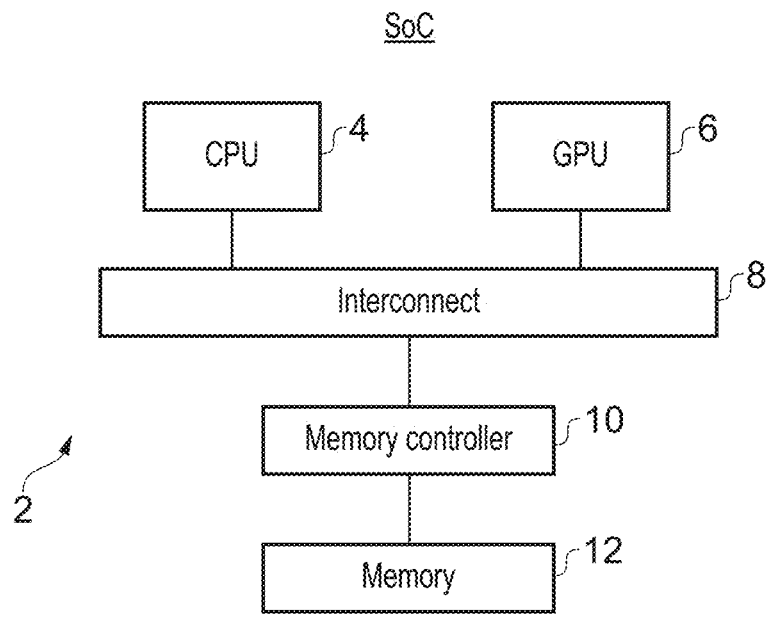
FIG. 1 schematically illustrates an example of an apparatus having a graphics processing unit (GPU)

An apparatus has texture mapping circuitry to perform texture mapping operations using texels defined by textures represented using at least one texture image stored in a memory system, and a texture cache comprising two or more banks of cache storage to cache texels for processing in the texture mapping operations. Texture cache access control circuitry controls access to cached texels within the texture cache. The cached texels may not necessarily be in the same format as the corresponding data stored as part of the texture image stored in the memory system. For example, some implementations may store the images in compressed form in memory and perform decompression when reading the stored data from memory before allocating the decompressed texel data to the texture cache.

The way in which texels are mapped to the banks of cache storage can affect performance, because while parallel reads to information stored in different banks of cache storage may be possible within the same processing cycle, it may not be possible to read two locations within the same bank within the same processing cycle, Bank conflicts can cause loss of performance because it means access to two texels, which would ideally be read in parallel but cannot be read in parallel due to being stored in the same bank, may need to be serialised. To reduce likelihood of bank conflicts, it can be useful for the texture cache access control circuitry to support more than one bank mapping, with each bank mapping corresponding to a different mapping of the respective texels within a given chunk of texels to the plurality of banks of cache storage of the texture cache. The selection of which bank mapping is the selected bank mapping for a given chunk of texels may depend on at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis. Hence, different chunks of texels at different chunk position coordinates within a texture image can be allocated to the texture cache with a different mapping of the texels within that chunk to the respective banks of cache storage, which can improve performance, compared to an approach which uses the same bank mapping for all chunks of texels, by reducing the likelihood that when reading texels at corresponding positions within different chunks of texels there is a bank conflict causing loss of performance.

However, the inventors recognised that even when selecting the selected bank mapping for a given chunk of texels based on the first and/or second chunk position coordinate of the given chunk of texels, there may still be some scenarios when bank conflicts arise relatively frequently which can provide a noticeable drop in performance for certain graphics processing applications. For example, when processing very small texture images, bank conflicts become more likely because there may not be enough texels to cover more than one chunk, so that the chunk position coordinate based selection scheme cannot differentiate between cached texels of the smaller texture images. Hence, while selecting the bank mapping based on chunk position coordinate improves performance compared to using the same bank mapping for texels at all chunk positions, it nevertheless may result in certain bank mappings being used more frequently than others, so that the frequency of bank conflict can be relatively high in some use cases.

In the examples discussed below, in at least one operating mode of the texture mapping circuitry, the texture cache access control circuitry selects the selected bank mapping for the given chunk of texels of the given texture image depending on at least one of the first and second chunk position coordinates, and also depending on at least one further texture attribute associated with the given texture image. Hence, rather than selecting the bank mapping based solely on chunk position, at least one further texture attribute other than chunk position is also considered. This means that chunks of texels at corresponding chunk positions within different texture images associated with different further texture attributes can be assigned different bank mappings. There can be some graphics processing apparatuses where it is relatively common for texels at corresponding positions in different texture images to be read out in a relatively short period of time, so that it can be useful to be able to parallelise the reads of those texels, but this would not be possible if there is a bank conflict. By using different mappings for texels at corresponding chunk positions within different texture images, as distinguished based on the further texture attribute of the texture images, the probability of bank conflicts arising may be reduced and hence average performance can be improved.

The bank mappings supported by the texture cache access control circuitry may support at least a first bank mapping and a second bank mapping. In the first bank mapping, a texel at a given position within the given chunk is mapped to a first bank of cache storage of the texture cache. In the second bank mapping, the texel at the given position within the given chunk is mapped to a second bank of cache storage of the texture cache different from the first bank.

The first and second chunk position coordinates represent the position of the given chunk within the given texture image, with respect to the first and second texture axes of the texture image respectively. The first and second texture axes may correspond to the horizontal and vertical axes of a two-dimensional texture image when viewed relative to the texture image itself (rather than relative to axes of the image frame being rendered). For example, it can be common to denote the first and second texture axes of a given texture image as u and v respectively, distinguishing from the x, y, z axes of a three-dimensional scene to be rendered. Part of the texture mapping operation may be to rotate the u, v axes of a texture as necessary to map to the orientation of the surface on which the texture is to be applied. It is not essential that both of the first/second chunk position coordinates are used to select the selected bank mapping. Some implementations may only consider one of the chunk position coordinates, which could be the chunk position relative to either the first texture axis u or the second texture axis v.

The at least one further texture attribute used for the bank mapping selection can be any texture attribute, other than the first and second chunk position coordinates. It is not essential for the further texture attribute to have another meaning, outside of the use of the texture attribute for the bank mapping selection. For example, in some implementations, each texture image could be assigned an arbitrary identifier, used to subdivide a set of texture images into a number of subsets for the purpose of the bank mapping selection. Even if the identifiers are allocated in a relatively arbitrary manner, this may still tend to reduce the frequency of bank conflicts by reducing the pool of texture images that share the same bank mapping for chunks of texels at the same chunk position, improving performance on average by smoothing out the frequency distribution with which the different bank mappings are selected in practice.

However, in some implementations, the at least one further texture attribute comprises an attribute indicating which of a plurality of texture images of a multi-image texture is the given texture image. For a number of reasons, it can be common for a given texture to be defined using multiple texture images, and it can be relatively common for texels within different texture images of the multi-image texture to be blended together in a filtering operation, so that reads to texels at corresponding positions within the different texture images may need to be performed in a short period of time, making it useful to be able to parallelise the reads to these texels by allocating those texels to different banks of cache storage. Therefore, compared to an arbitrary further texture attribute, performance can be improved to a greater extent by using the attribute indicating which of the texture images of the mufti-image texture is the given texture image, for controlling the bank mapping selection. Also, re-using an existing texture attribute (already assigned for other purposes) for use in the bank mapping selection can avoid the need to add an additional texture attribute, which can help to reduce the size of each cache line of the texture cache and avoid needing to expend circuit logic on circuitry for allocating a dedicated bank mapping texture attribute to each texture image.

Various examples of specific multi-image textures are now set out below.

In one example, a multi-image texture may be defined using a number of mipmap texture images which represent the same texture at different resolutions. This can be useful to avoid needing to read an unnecessarily high-resolution image when the texture is being applied to a surface which is relatively far from the viewpoint within the rendered scenes so that only a relatively small number of graphics fragments will be textured using that texture. By defining multiple mipmap images at different resolutions, the appropriate mipmap image for the level of detail required can be selected. However, simply selecting the mipmap image at the resolution closest to the level of detail required can cause visible artefacts at the positions where the texture mapping swaps from using one mipmap texture image to another, and so it can be common for filtering to be applied to blend texels from different mipmap texture images to determine the values to be applied at a given position of the rendered frame. Particularly if using relatively small mipmap images at the lowest resolution, selecting the bank mapping solely based on chunk position may not be effective to avoid bank conflicts, because, for example, if the mipmaps being used are small enough that all the texels within that mipmap texture image can fit within a single chunk of texels, then all accesses to the cache for those mipmap images will use the same bank mapping.

Hence, when the given texture image is one of a plurality of mipmap texture images representing a same texture at different resolutions, the at least one further texture attribute comprises a mipmap level associated with the given texture image, the mipmap level identifying which of the plurality of mipmap texture images is the given texture image. By using the mipmap level to select the bank mapping, this allows different mipmaps to be assigned different bank mappings so as to reduce the likelihood of bank conflicts. This can be beneficial to performance.

More particularly, the texture cache access control circuitry can select the selected bank mapping for the given chunk of texels based on the mipmap level, to cause different bank mappings to be used for chunks of texels at corresponding positions within mipmap texture images at neighbouring mipmap levels. For example, this can be done by using the least significant bit of the mipmap level of the given texture image as the further texture attribute used to control bank mapping selection. Since the mipmap texture images likely to be blended together in a filtering operation are the texture images at neighbouring mipmap levels, assigning different bank mappings for chunks of texels at a corresponding chunk position within the mipmap texture images at neighbouring mipmap levels can help to improve performance in comparison to the performance achieved with other ways of selecting the bank mapping based on the mipmap level.

It is not necessary for the bank mapping selection to depend on the at least one further texture attribute in all instances of performing texture mapping (although this is also possible). In some cases, it may only be for certain operating modes of the texture mapping circuitry that the bank mapping depends on the at least one further texture attribute, and for other modes the selected bank mapping could be independent of the at least one further texture attribute. For example, in another mode, the bank mapping selection could either depend solely on the first and/or second chunk position coordinate, or alternatively no bank mapping selection could be performed at all in the other mode with all chunks of texels simply using the same bank mapping when the texture mapping circuitry is in a mode other than the at least one operating mode described above.

One example of a specific operating mode for which the bank mapping selection based on the at least one further texture attribute can be useful is a trilinear filtering mode in which the texture mapping circuitry is configured to perform trilinear filtering using cached texels of different mipmap texture images read in parallel from the texture cache. In texture mapping, bilinear filtering is a filtering operation which performs image smoothing by blending different texels within the same texture image (e.g. to account for resizing or warping of the texture to fit on the surface to which the texture is applied, in which case a fragment at a given position of that surface may have its fragment data values calculated as a function of multiple adjacent texels of the texture image). Trilinear filtering provides further smoothing by blending together texels in different texture images at different mipmap levels, to reduce noticeable artefacts at the position in the frame where the closest mipmap level to the level of detail required switches from one mipmap level to another. Some implementations of trilinear filtering may not attempt to read texels from different mipmap levels in parallel and in that case bank conflicts may not arise for the reads to the different mipmap levels. Other implementations may have a trilinear filtering mode which does attempt to perform parallel reads to cached texels from different mipmap texture images, and in such a mode the bank conflicts may be particularly likely to arise in cases where relatively small mipmaps are being processed using trilinear filtering. Hence, the technique discussed above can be particularly useful for the trilinear filtering mode which attempts parallel reads to cached texels in different mipmap texture images of the same multi-image texture.

It is also possible to use the bank mapping selection based on the further texture attribute for other operating modes which access mipmap texture images even if those other operating modes do not use trilinear filtering. For example, even if the performance benefit of selecting bank mappings based on the mipmap level is greatest when in the trilinear filtering mode, some implementations may use cached metadata associated with a given cache line to indicate which bank mapping to use for interpreting the texel data read from the different banks of the cache line, and so once this cached metadata has been determined for a cache line, that cache line could be accessed in different operating modes, so the bank mapping selected based on the at least one further attribute may end up being used across any of the operating modes which use the mipmap texture images, regardless of whether the current operating mode is a trilinear filtering mode.

Another example of a multi-image texture is a cubemap texture which comprises a number of cubemap face texture images representing textures of respective faces of a cube. For example, this can be useful for representing views in different directions from the viewpoint of a player within a scene, as the textures on the different internal faces of the cube can be used to represent the view on the horizon seen by the player in different directions. Mapping the different views as faces of a cube can be more efficient computationally than mapping the views to the internal surface of a sphere. Where cube mapping is used, some blending of texels in different cubemap face texture images of the same cubemap texture may be performed at the edges where different faces of the cube meet, to reduce noticeable discontinuities at the cube edges. At certain cube edges, bank conflicts may be likely if the same bank mapping is used for chunks at the same first or second chunk position coordinate within different cubemap faced texture images. Therefore, when the given texture image is one of a plurality of cubemap face texture images representing textures of respective faces of a cube, the at least one further texture attribute used for bank mapping selection may comprise a face identifier identifying which of the plurality of cubemap face texture images is the given texture image, By considering the face identifier the frequency of bank conflicts can be reduced, to improve performance.

More particularly, for at least one edge of the cube at which first and second faces represented by first and second cubemap face texture images meet, the texture cache access control circuitry may select different bank mappings to be used for chunks at corresponding positions within the first and second cubemap face texture images. It is not essential for different bank mappings to be used for the two cubemap face texture images meeting at every edge of the cube. One way of ensuring that any pair of adjoining cubemap face texture images (which represent faces meeting at an edge of the cube) use different bank mappings may be to provide three different bank mappings supported by the texture cache access control circuitry, each bank mapping assigned to a different pair of opposed cube faces. However, this would require three different bank mappings to be supported and this may incur extra circuit area cost and wiring congestion in providing circuitry which can reorganise a set of texels into the appropriate bank mapping positions when reading and writing texels in the texture cache. If only two bank mappings are desired to be supported for reasons of circuit implementation efficiency, then there may be some faces of the cubemap texture which may adjoin another face which uses the same bank mapping. Nevertheless, by assigning different bank mappings to at least some of the cubemap face texture images of the cube, at least some bank conflicts are likely to be avoided, and the average performance is improved compared to implementations which use the same bank mapping for chunks of texels at corresponding chunk positions within each cube face.

Another example of a multi-image texture is a volumetric texture which extends in three dimensions and comprises a number of slice texture images each representing a respective two-dimensional slice through the volumetric texture. As the majority of textures processed by the texture mapping circuitry may be two-dimensional textures, the texture cache may be accessed based on texel positions in two dimensions, for example based on the first and second chunk position coordinates described above. For volumetric textures, rather than considering the third dimension as a further position coordinate, the different slices through the volumetric texture can be considered as different two-dimensional texture images with a slice identifier distinguishing the depth position represented by that slice. Volumetric textures can be useful for enabling objects such as clouds or smoke to be rendered within a three-dimensional volume in space. When performing texture mapping for volumetric textures, it may be relatively common that some filtering operations blend together texels at corresponding chunk positions within different slice texture images of the volumetric texture and so bank conflicts may be relatively likely if the bank mapping is selected solely based on chunk position.

Hence, when the given texture image is one of a plurality of slice texture images representing respective slices through a volumetric texture extending in three dimensions, the at least one further texture attribute comprises a slice identifier identifying which of the slice texture images is the given texture image. By selecting the selected bank mapping for a given chunk of texels based on the slice identifier, this again improves performance by reducing the frequency of bank conflicts.

The texture cache access control circuitry may select the selected bank mapping for the given chunk of texels based on the slice identifier, to cause different bank mappings to be used for chunks of texels at corresponding positions within neighbouring slice texture images of the volumetric texture. Compared to other ways of using the slice identifier to determine the bank mappings, this tends to improve performance because the most likely slice texture images to be blended together are those representing slices at neighbouring positions along the third texture axis orthogonal to the first and second texture axes. Hence, it can be useful for texture images with odd-numbered and even-numbered slice identifiers to be assigned different bank mappings for texels at the same chunk position coordinate.

Another example of a multi-image texture can be an array texture which defines an array of different textures as an array structure using a single texture identifier. Each element of the array may be an essentially independent texture, but defining multiple textures as an array can simplify the programming overhead of defining the textures and referencing those textures in graphics programming code. For example, the array can represent a "menu" of textures available for selection for applying to different portions of a graphics model. For example when rendering a cityscape scene, the textures to be rendered at different points of the city may be selected from a number of options such as concrete, brick, grass, gravel, etc., and so an array can be defined comprising the textures corresponding to the different material types which can then be assigned to different positions within the rendered scene. It may be useful for performance (especially for relatively small texture images) to be able to read texels from corresponding chunk positions in different array texture images of the array in parallel. Hence, when the given texture image is one of a plurality of array texture images of an array texture identified as an array using a single texture identifier, the at least one further texture attribute may comprise an array index identifying which of the plurality of array texture images is the given texture image.

Another example of a multi-image texture is a multi-sample texture which comprises a number of sample texture images to be processed using multi-sample anti-aliasing (MSAA). MSAA is a technique for reducing occurrence of "jaggies" where a line oriented diagonally relative to pixel axes appears to be jagged due to the limited pixel resolution available for rendering. By providing a number of sample texture images and blending together the colours or other attributes for different samples at the same pixel position, this can reduce the visible artefacts caused by aliasing. In an operating mode which uses multi-sampling anti-aliasing of a multi-sample texture, texels at corresponding chunk positions within different texture images may be blended together and so it can be useful to be able to read those texels in parallel, but selecting a bank mapping solely based on chunk position may result in the texels desired to be read in parallel being stored in the same bank causing bank conflicts which prevent the parallel reads. By considering a sample identifier, which identifies which of the sample texture images is the given texture image, as an input parameter for the bank mapping selection, the likelihood of bank conflicts can be reduced, and so performance can be improved.

Hence, a number of examples of the further texture attribute described above. It will be appreciated that any two or more of these examples could be combined, and so the bank mapping selection could depend on two or more of these example attributes. For example, any one of the cubemap texture, volumetric texture, array texture or multi-sample texture may further define multiple mipmap levels for each cubemap face, slice of the volumetric texture, array texture element, or sample texture, so some examples could consider both the mipmap level and one of the face identifier, slice identifier, array index or sample identifier when selecting a bank mapping. Which particular set of texture attributes is used to select the bank mapping for a given chunk of texels may depend on the texture mapping mode of operation being used and/or on the type of texture being processed.

The first and/or second chunk position coordinates and the at least one further texture attribute may not be the only information used to select a bank mapping for use for a given chunk of texels. In some examples, the bank mapping may also depend on a texture format used to store the corresponding texture in the memory system. For example, different texture formats may define different numbers of bits per texel which can affect the mapping of texels to banks. In some examples it may only be for operating modes acting on certain texture formats that the bank mapping depends on the at least one further texture attribute, with other texture formats using a bank mapping that is independent of the at least one further texture attribute.

The total number of bank mappings supported can vary. For example, some examples may support three, four or more bank mappings. However, there is a circuit area, power and design complexity cost to implementing additional bank mappings, due to the additional wiring needed to be able to rearrange texels derived from data read from memory to the appropriate bank positions when writing to the texture cache and to rearrange the cache texels read from the banks of the texture cache into appropriate positions for processing in a texture mapping operation when reading from the texture cache, as well as a cost in implementing the corresponding control logic for controlling such texel rearrangements. In some implementations, it may be preferred to support only two bank mappings to reduce this implementation cost. Even with only two bank mappings being supported, this can still provide a noticeable performance improvement compared to using a single bank mapping for all chunks of texels.

The technique described above can be used in any apparatus which performs texture mapping operations. The technique can be particularly useful for a graphics processing unit (GPU). The GPU may comprise the texture mapping circuitry, texture cache and texture cache access control circuitry described above.

Some specific examples are described with reference to the Figures below. It will be appreciated that the claimed subject-matter is not limited to these particular examples, FIG. 1 schematically illustrates an example of an apparatus 2, e.g. a system-on-chip (SoC), which comprises a number of processing elements, for example at least one central processing unit (CPU) 4 and at least one graphics processing unit (GPU) 6. The CPU 4 executes instructions to perform general-purpose processing operations represented by the instructions. The GPU 6 is designed to perform processing operations targeting certain applications involving many parallel threads of processing which apply corresponding operations to many different data inputs. For example the GPU 6 may comprise execution units for performing a greater number of operations in parallel than the CPU 4, but may support a narrower range of processing operation types than the CPU 4. For example, the processing assigned to the GPU 6 by the CPU 4 may include graphics processing operations, or operations for implementing a machine learning model such as a neural network. While FIG. 1 shows a single CPU 4 and single GPU 6 for conciseness, other examples can have multiple instances of the CPU 4 and/or GPU 6.

The CPU 4 and GPU 6 share access to shared memory 12. An interconnect 8 couples the processing elements 4, 6 together and manages access to the shared memory 12, e.g. implementing a coherency protocol to manage coherency between data cached at the CPU 4 or GPU 6. Access to a specific memory storage device of the memory 12 is controlled by a memory controller 10 based on the messages received from the interconnect 8. It will be appreciated that the apparatus 2 can have many other system components not shown in FIG. 1.

Figure 2:
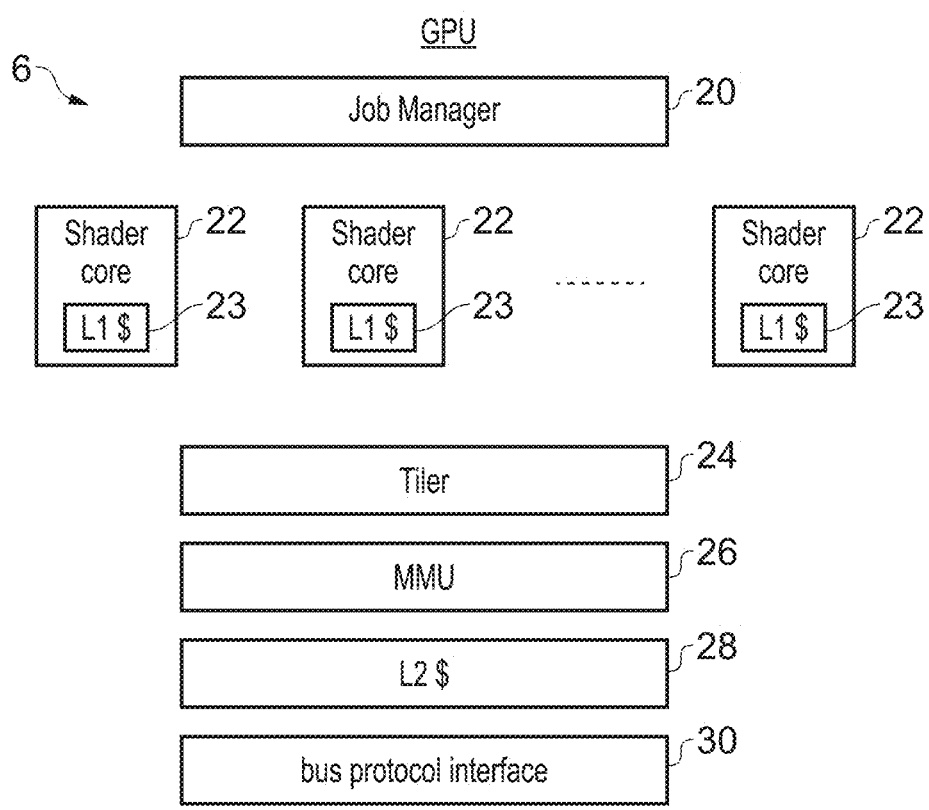
FIG. 2 schematically illustrates an example of components of the GPU.

FIG. 2 illustrates an example of components of the GPU 6. The GPU 6 comprises a bus protocol interface 30 for retrieving data and instructions from the interconnect 8 and providing data such as processing results back to the interconnect 8. The bus protocol interface 30 manages forming of messages to output onto the interconnect and parsing of messages received from the interconnect according to the bus protocol implemented by the interconnect 8. The GPU 6 has at least one cache 28 (such as a level 2 cache memory, L2$) for storing data and/or instructions for input or processed data for output. A memory management unit (MMU) 26 can perform address translation and memory protection functionality.

A job manager 20 controls the execution of processing tasks or jobs, for example being tasks or jobs established by the CPU 4, with the GPU-specific execution being performed by a set of shader cores 22 and tiler circuitry 24. The shader cores 22 may each have at least one further cache 23 (e.g. a level 1 cache memory, L1$) for caching data being operated upon by the shader core 22. The shader cores 22 are processing units specifically designed for handling graphics processing instructions for manipulating pixels and polygon vertices within an image so as to render portions of that image. Although designed for graphics processing, the shader cores 22 can also be controlled to perform other types of operations, such as machine learning model processing.

The tiler circuitry handles portions of the GPU rendering operations, these portions corresponding to discrete regions or tiles of the rendered image. This process (of dividing the overall processing into tasks or regions) can reduce the instantaneous memory and data transfer requirements which occur during the rendering process by the GPU 6. The job manager 20 allocates jobs to the shader cores 22 and to the tiler circuitry 24. While FIG. 2 shows an example of a GPU with a tiler 24 for supporting tiled rendering, the techniques for selecting bank mappings for a texture cache described below could also be used in a GPU using immediate-mode rendering.

In the drawing of FIG. 2, a group of four shader cores 22 is shown. In practice, a GPU may contain many shader cores, potentially more than four.

Figure 3:
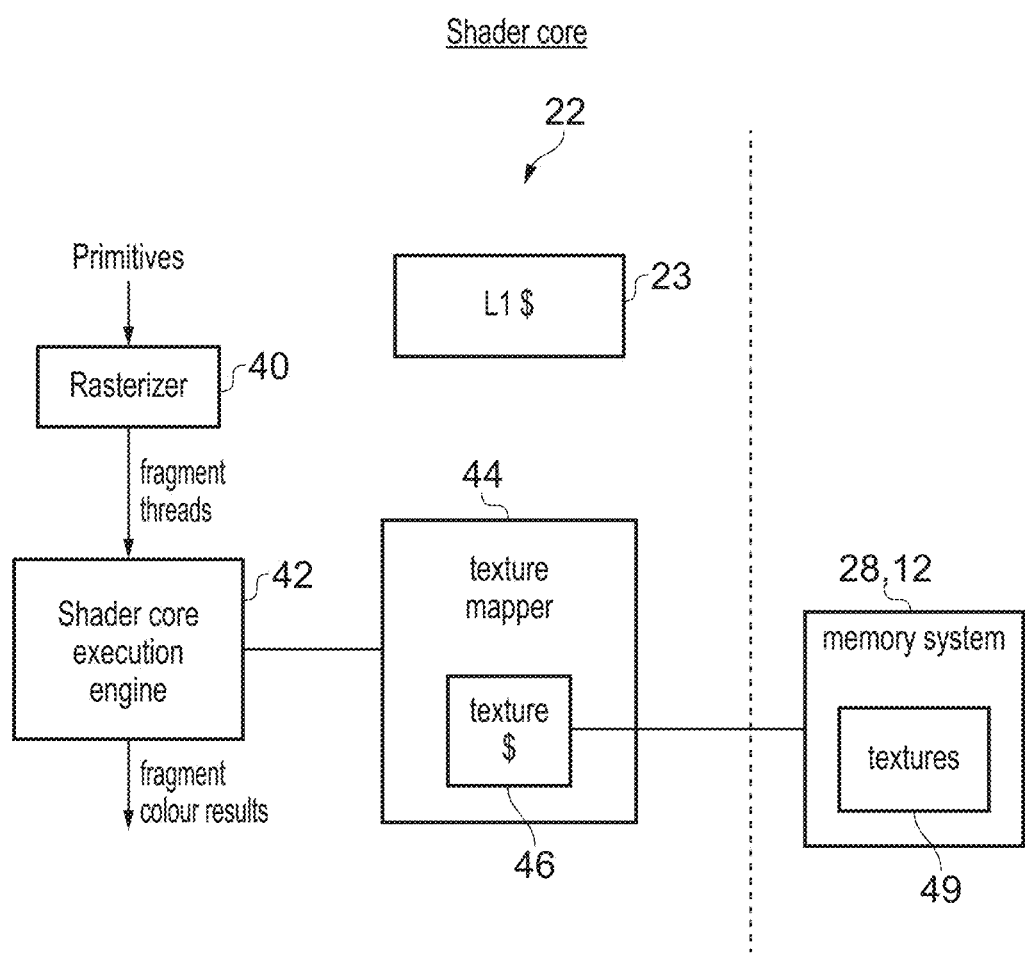
FIG. 3 schematically illustrates an example of components of a shader core of the GPU.

FIG. 3 illustrates in more detail an example of components of an individual shader core 22. The shader core 22 receives, from the tiler 24, input data defining vertex positions and attributes of a number of primitives (e.g. triangles) to be displayed in the tile being processed. A rasterizer 40 rasterizes the primitives to generate fragments (e.g. pixels) which fill the area occupied by the corresponding primitive.

A number of threads of fragment shader execution are issued to the shader core execution engine 42 for each fragment generated by the rasterizer 40. The shader core execution engine 42 performs fragment shading to determine, for each fragment, one or more attributes such as colour, shadow, opacity, etc. to be assigned to the fragment. The fragment shader results, such as colour values for each fragment, are output. The shader core 22 has the level 1 cache 23 which can be used to store input data and instructions loaded from the memory system 28, 12. For example, the level 1 cache 23 can be used to store primitive input data, fragment shader code, etc.

One operation performed as part of the fragment shader processing is texture mapping performed by a texture mapper 44. The graphics model represented by the primitives and rasterised fragments defines shapes for representing objects within a rendered scene, but to add realism the values to be set for fragments at different positions on a surface of such objects are determined by the texture mapper 44 based on "textures" 49 defined by the graphics designer. Some textures are defined as procedural textures for which the colour values etc. to be assigned at a given point of the texture can be calculated using an arithmetic function of coordinates in space, without referencing any stored image. However, many textures may be defined using texture images 49 stored in the memory system 28, 12, which can be read by the texture mapper 44 and used to compute the colour (and optionally other attributes) to be assigned to fragments at particular positions within the rendered scene. Such texture images 49 may define a set of "texture data elements", referred to as "texels", with each texel defining one or more attributes (e.g. colour, opacity) for a corresponding position within the texture. The texels are defined with respect to a coordinate system defined relative to the texture itself, as the same texture could be applied in different orientations within the scene being rendered. The texture mapper 44 can determine how to transform the texture into the coordinate system of the rendered scene when applying the texture to a particular surface, to account for any differences in size, orientation and warping of the surface to which the textures applied relative to the original texture image. The texture mapper 44 has a texture cache 46 for caching texels derived from texture images read from the memory system.

Figure 4:
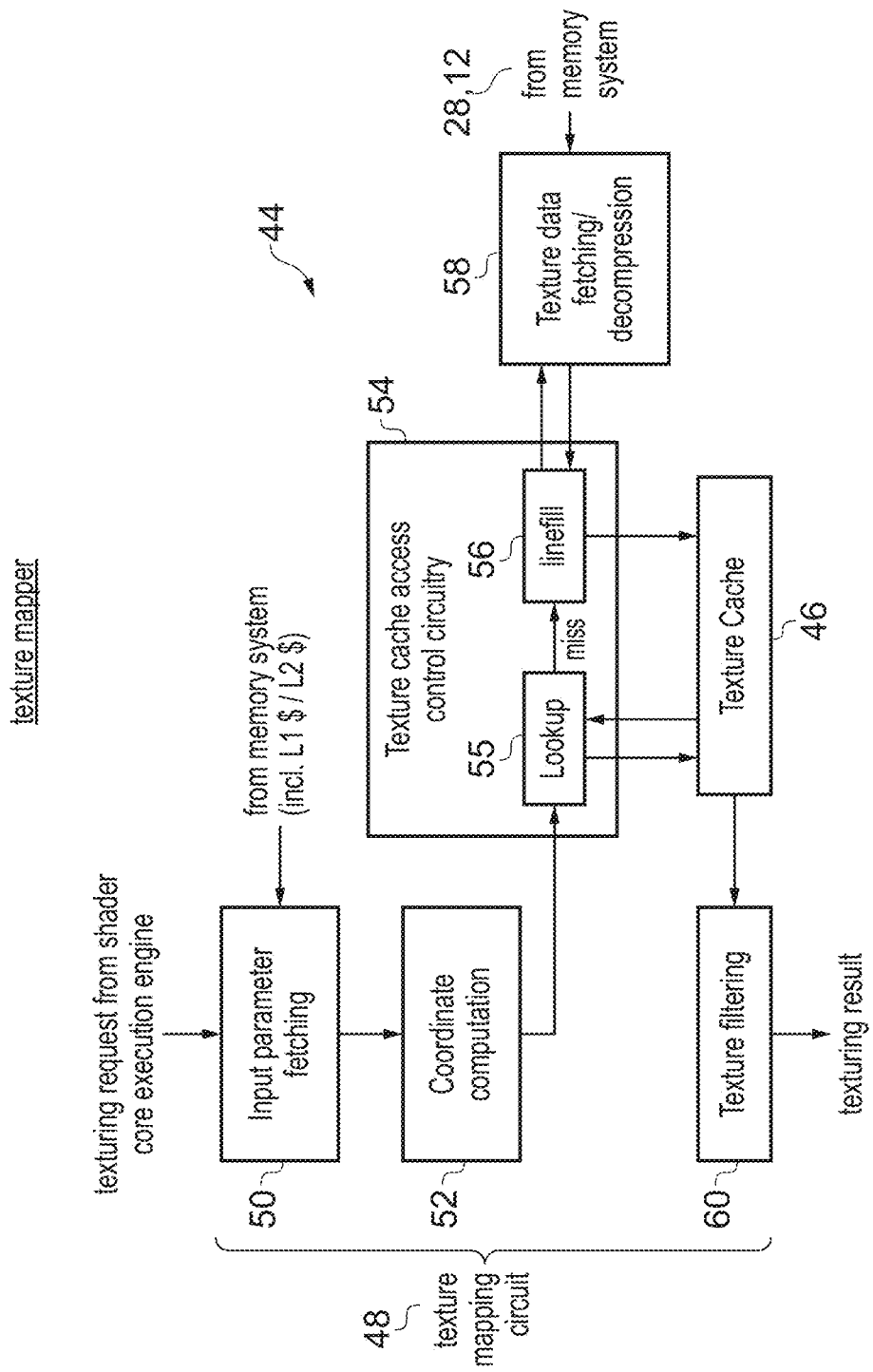
FIG. 4 schematically illustrates an example of components of a texture mapper used by a shader core to perform texture mapping operations.

FIG. 4 illustrates the texture mapper 44 in more detail. The texture mapper comprises texture mapping circuitry 48 for performing the texture mapping operations, the texture cache 46, texture cache access control circuitry 54 for controlling access to the texture cache, and texture data fetching and decompression circuitry 58 for fetching texels from the memory system and applying any reformatting operations before allocating the fetched data to the cache. The reformatting operations may include decompressing compressed image data read from memory before allocating the decompressed texels to the texture cache 46.

The texture mapping circuitry 48 includes input parameter fetching circuitry 50 for fetching input parameters for texture mapping operations from the memory system, in response to a texturing request received from the shader core execution engine 42. For example, the input parameters may define a texture identifier identifying which texture is to be applied for shading fragments, the type of texturing operation to be performed, information specifying the size and position of the corresponding primitive and the position of the relevant fragments within the primitive, etc. Coordinate computation circuitry 52 identifies the texel coordinates within a given texture that will need to be applied for shading the fragments relating to the texturing request. The identified coordinates are then provided to the texture cache access control circuitry 54 which includes lookup circuitry 55 for looking up the texture cache 46 based on the texture identifier of the textures to be applied and the generated texel coordinates to identify whether the required texels are already cached in the texture cache 46. If the request misses in the texture cache then linefill circuitry 56 generates a linefill request to request that the texture data fetching circuitry 58 fetches the required texels from the memory system and then the linefill circuitry 56 stores the obtained texels into the cache, and also the obtained texels are returned to the texture mapping circuitry 48. If the request from the lookup circuitry 55 hits in the texture cache 46 then there is no need for a line till operation and the cached texels read from the texture cache 46 can be provided to the texture mapping circuitry 48. The texture mapping circuitry 48 includes texture filtering circuitry 60 which performs filtering operations using the texels obtained from the texture cache 46 or from the memory system 28, 12, to determine the fragment attributes to be applied to certain fragments. For example the texture filtering circuitry can perform blending operations to blend a number of texel values together to obtain the attributes for a given fragment. The texturing results are returned to the shader core execution engine 42.

The texture mapping operations performed by the texture mapping circuitry 48, such as coordinate computation and texture filtering, can be controlled according to any known texture mapping technique. The examples below discuss the way in which the texture cache 46 is managed for caching texels obtained based on texture images stored in the memory system.

Figure 5:
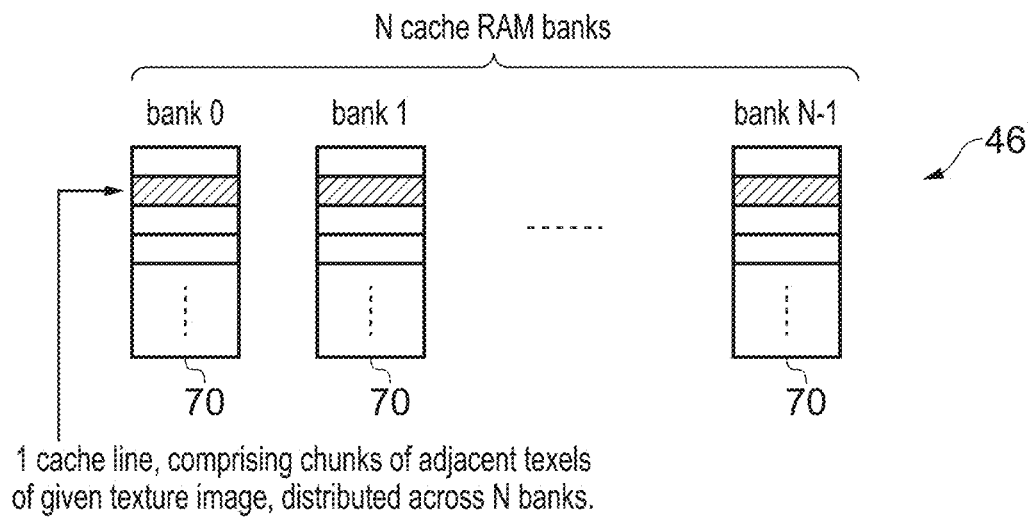
FIG. 5 illustrates a texture cache comprising banks of cache storage for caching texels for use in texture mapping operations.

FIG. 5 illustrates the texture cache 46, which comprises a certain number (N) of cache RAM banks 70, each bank 70 comprising a certain number of cache entries for storing texels. For example, the number N of cache RAM banks 70 could be 4, 8, or 16, or greater. Entries in different banks can be read in parallel the same processing cycle, while entries within the same bank cannot be read in the same processing cycle. Hence, given locality of access which means it is likely that a number of adjacent texels will be needed at a given time, a cache line allocated for storing texel data for a chunk of adjacent texels of a given texture image is striped across the cache banks 70 so that the cache line comprises one entry in each of the banks. By mapping nearby texels of the same chunk to different cache banks, this can be improve performance compared to storing the entire chunk of texels in one bank.

Figure 6:
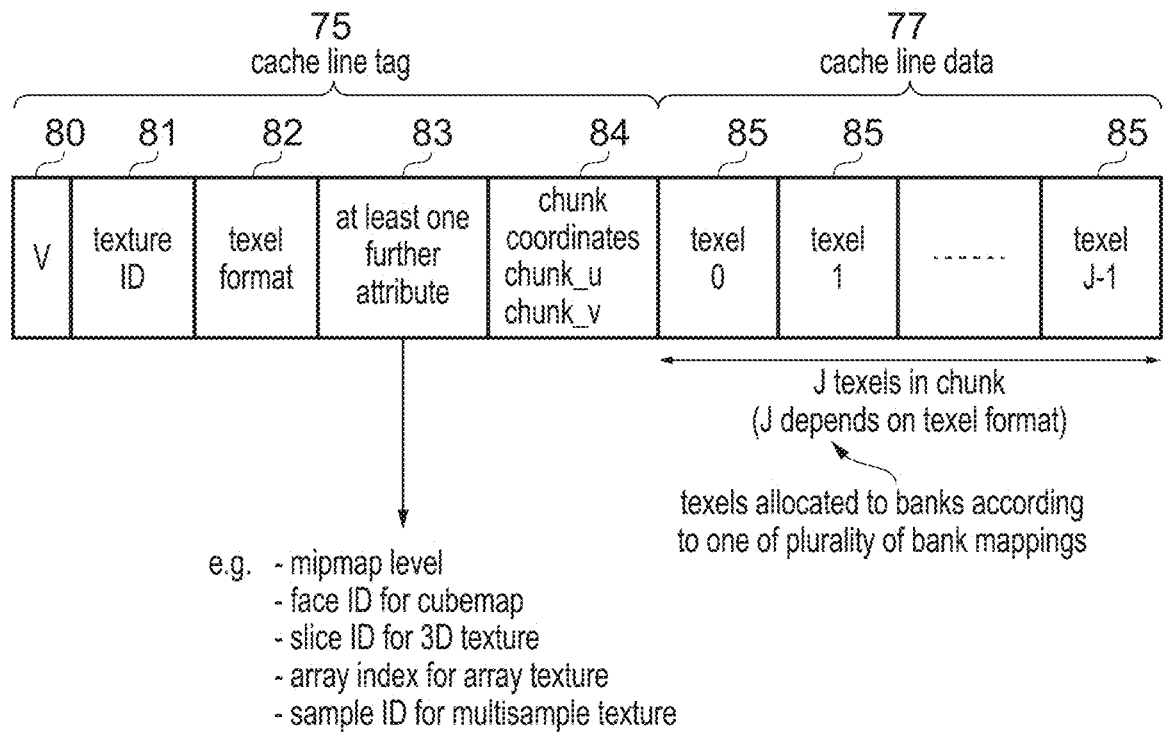
FIG. 6 illustrates an example of a cache line of the texture cache.

FIG. 6 shows in more detail information specified for a single cache line of the texture cache 46. The cache line includes a cache line tag 75 and cache line data 77. The tag 75 can be stored in tag storage which is separate from the cache RAM banks 70 shown in FIG. 5. The cache line data 77 is distributed across the respective banks 70. The cache line data 77 comprises a certain number (J) of texels 85. The particular number J depends on the texel format used and the size of the cache line, which can vary for different textures. For example, if each texel requires 32 bits of data and the cache line stores 1024 bits of data then J=32, but the same cache implementation may store J=64 texels per cache line if a different texel format with 16 bits per texels was used. For each texel 85, the texel data includes various texel attributes such as colour, opacity, etc. For example, one texel format could represent red, green, blue colour channel values and an alpha channel value representing opacity using four 8-bit values respectively, giving a total of 32 bits per texel.

The cache line tag 75 is used by the lookup circuitry 55 for looking up the cache 46, to determine whether required texels are present in the cache. The cache line tag 75 includes:

a valid indicator 80 for indicating whether the cache line is valid;

a texture identifier 81 corresponding to the particular texture from which the cached texels was derived;

a texel format indicator 82 identifying the format of the texel data in the cache line data 77 (which can be used by the texture cache access control circuitry 54 to identify how to partition the data read from the cache in response to a given lookup request to provide corresponding texels to the texture mapping circuitry 48);

at least one further attribute 83 related to the particular texture image from which the texels were derived (e.g. the further attribute could be any one or more of: a mipmap level, face identifier, slice identifier, array index or sample identifier, as discussed further below); and chunk position coordinates 84 identifying the positions of the chunk of texels represented by the cache line data 77 relative to first and second texture axes of the corresponding texture image.

FIG. 6 shows an example where the at least one further attribute is stored in the cache line tag and used to select bank mapping to use for the read cache line. Another option would be to provide a bank mapping field (not shown in FIG. 6) which indicates which bank mapping to use when reading the cached texels of the cache line data 77 the texture mapper would use the bank mapping indication to determine the positions within the chunk of texels that are represented by the texel data stored in each bank of the cache line. For example, in the example of FIG. 20 discussed further below, the field indicating which bank mapping to use could be a bit indicating whether to switch or not switch the default bank mapping that would normally be selected based on chunk position coordinates 84 and/or texel format. By storing an indication of which bank mapping to use in the cache line tag 75, this would avoid the overhead of the operations for selecting the bank mapping based on the at least one further attribute (e.g. those shown in FIGS. 15-20) being incurred on every read of a cache line from the cache, as those operations could instead be performed once when writing cached texels to the cache, sharing the overhead across multiple reads to the same cache line.

Hence, a lookup request issued by lookup circuitry 55 for texels at a given position within a given texture image of a given texture may specify the texture ID 81, at least one further attribute 83 and chunk coordinates 84 corresponding to the required texels, and if there is a valid cache line which has the texture ID 81, further attribute 83 and chunk coordinate 84 fields matching the target values specified by the lookup request, then a hit may be detected in the cache and the corresponding texel data 85 returned from the entry that detected the hit. If there is no valid cache line which has all of the texture ID, further attribute and chunk coordinate fields 81, 83, 84 matching the target values, then a miss is detected by the lookup circuitry 55.

Figure 7:
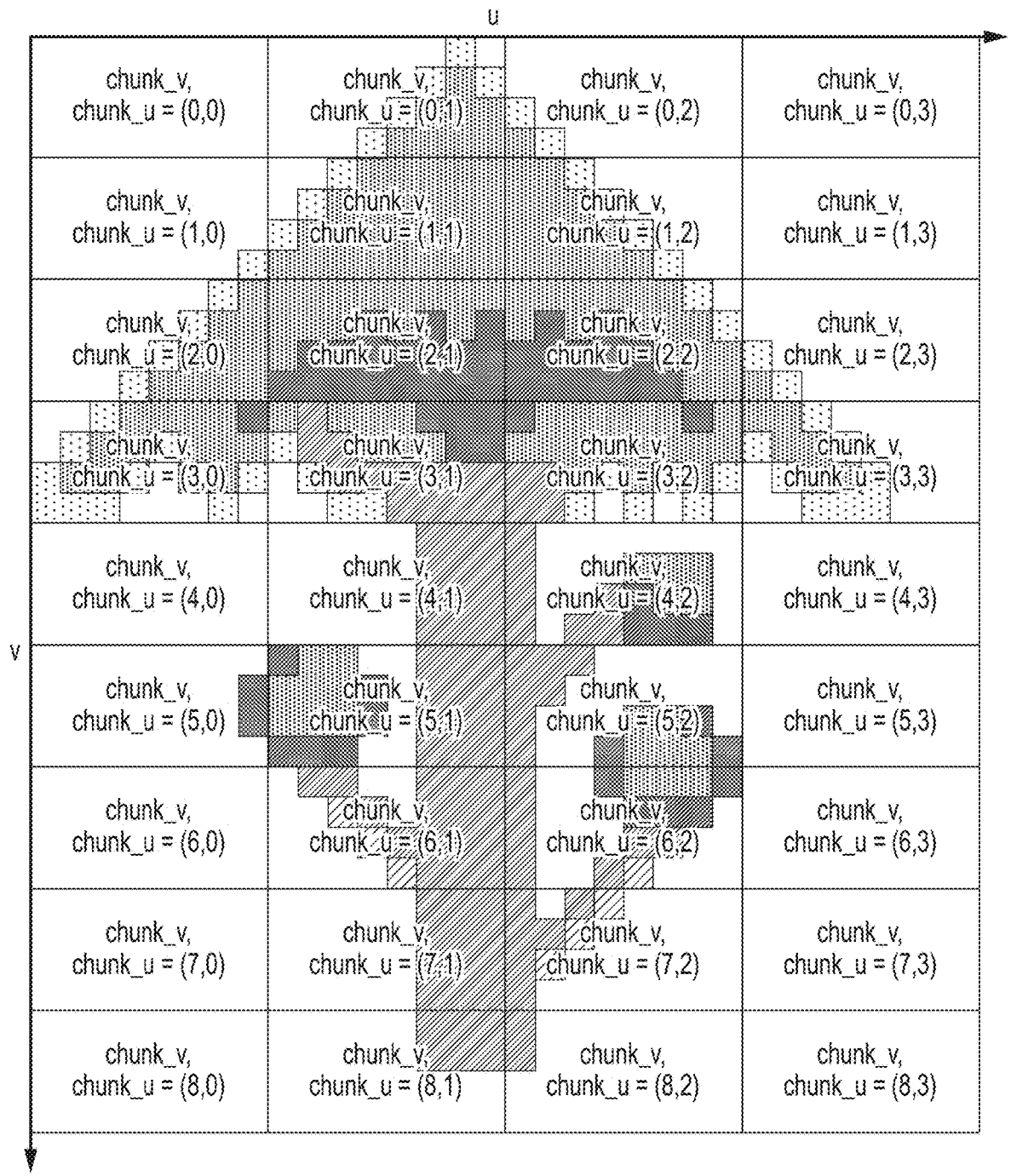
FIG. 7 illustrates an example of chunks of texels within a texture image.

FIG. 7 illustrates an example of a texture image divided into chunks, with each chunk corresponding to decompressed texels of a size equivalent to one cache line of the texture cache 46. In this particular example, each chunk comprises 32 texels, arranged in an 8×4 block. Each chunk has a first chunk position coordinate chunk_u indicating the position of the chunk relative to a first texture axis u and a second chunk position coordinate chunk_v indicating the position of the chunk relative to a second texture axis v.

Figure 8:
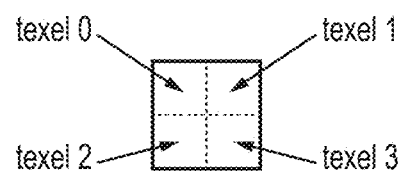
FIG. 8 illustrates two examples of bank mappings which can be selected for determining which banks of cache storage are used to store the respective texels within a chunk.

FIG. 8 illustrates an example of selecting different bank mappings based on the chunk position. In this example, the second chunk position coordinate, chunk_v, is used to select the bank mapping (and the bank mapping selection is independent of chunk_u). For chunks of texels having an even valued chunk_v coordinate, a first bank mapping is used as shown on the left hand side of FIG. 8, in which the four texels at the top left of the chunk are mapped to bank 0, the four texels at the bottom left of the chunk are mapped to bank 1, and so on for the other texels as shown in the left hand part of FIG. 8. For chunks of texels having an odd-valued chunk_v coordinate, a second bank mapping is used as shown on the right hand side of FIG. 8, in which the four texels at the top left of the chunk are mapped to bank 2, the four texels at the bottom left of the chunk are mapped to bank 3, and so on for the other texels as shown in the right hand part of FIG. 8. Hence, texels at the same relative position within the chunk are mapped to different banks in the different bank mappings. This is helpful to reduce the likelihood of bank conflicts when the texels to be read in parallel in a given processing cycle are mapped to the same bank. For example, it can be common to read the texels at corresponding relative positions within two adjacent chunks having the same chunk_u coordinate in parallel, and so selecting between the bank mappings shown in FIG. 8 based on the chunk_v coordinate can help to reduce the likelihood of bank conflicts and hence improve performance by allowing parallel reads more often.

While FIG. 8 shows an example where only the second chunk position coordinate, chunk_v, is considered for bank mapping selection, other chunk-position-based bank mapping selection schemes could select the bank mapping based on the first chunk position coordinate, chunk_u, or based on both chunk_u and chunk_v (e.g. the selection could be based on whether the sum of chunk_u and chunk_v is odd or even). It will be appreciated that the specific allocation of which bank is used to store each texel in a given bank mapping can vary—the mappings shown in FIG. 8 are just one example. It is also possible to provide more than two bank mappings.

Selecting between a number of different bank mappings based on chunk position can help to improve performance, but there are still some scenarios when bank conflicts may arise relatively frequently. For example, if processing very small texture images of size 2×2 texels or smaller (which may be common in some applications), each texture image may never extend beyond one chunk, so the same bank mapping may be selected for those texture images, and if the bank mapping is such that the first four texels (2×2) at the top left of the chunk are all assigned to the same bank as shown in FIG. 8, with very small texture images which do not extend beyond that 2×2 size, all the texels within that set of small texture images may be allocated to the same bank (e.g. bank 0 if the first bank mapping shown in FIG. 8 is used). Hence, even if there is cache bandwidth to be able to read additional texels for a different texture image, if that texture image is also of a small enough size that all the texels are mapped to bank 0, bank conflicts will arise causing the reads to the texels to have to be serialised, reducing performance. While one solution could be to change the bank mapping to have different banks selected for the 2×2 set of texels at the top left of a chunk, this may cause greater performance problems for other use cases involving texture images larger than 2×2.

Figure 9:
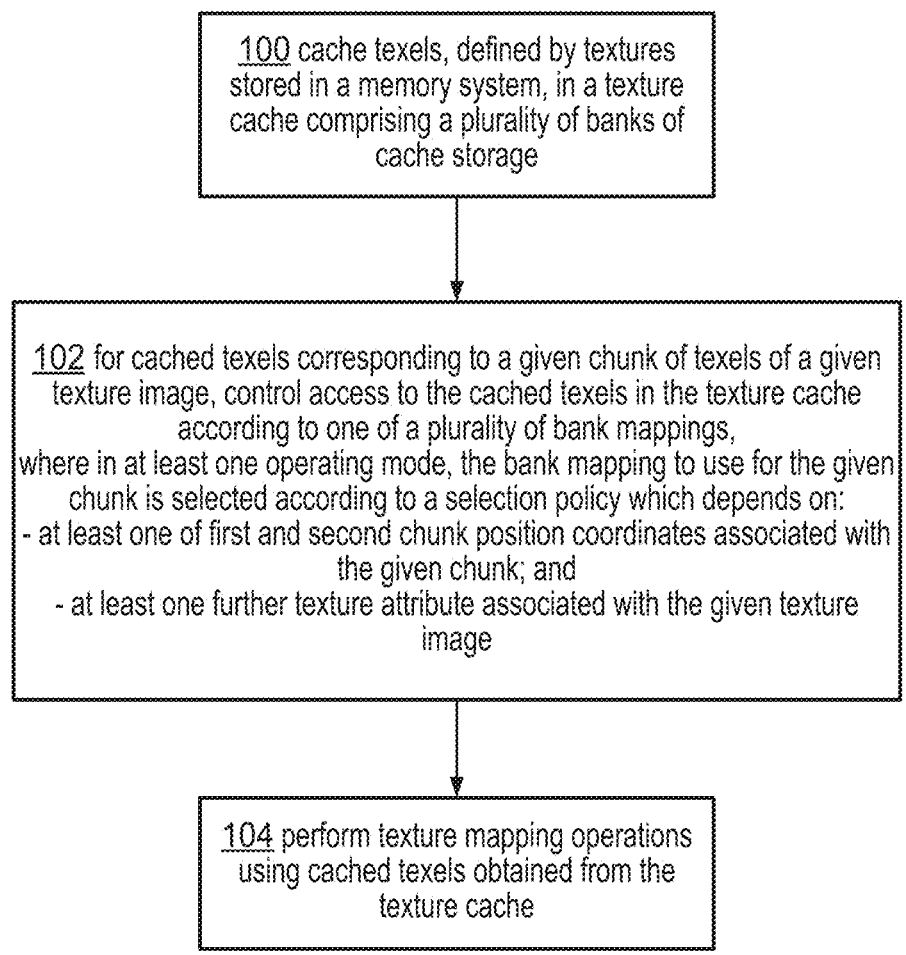
FIG. 9 is a flow diagram illustrating a method of selecting a bank mapping to use for a given chunk of texels.

FIG. 9 is a flow diagram showing a method for addressing this problem. At step 100, texels (defined by textures represented using at least one texture image stored in the memory system) are cached in a texture cache 46 comprising a number of banks 70 of cache storage. The cached texels do not need to have the same format as the data stored in memory. It is possible that reformatting operations, such as decompression, can be applied by the texture data fetching circuitry 58 before storing the reformatted data in the cache. Also, the textures represented using texture images stored in the memory system may not be the only type of textures supported by the texture mapper 46, as the texture mapper 46 can also support procedural textures defined by computational algorithms. Nevertheless, the cache bank mapping selection technique described here is useful when processing textures defined using texture images stored in memory.

At step 102, for cached texels corresponding to a given chunk of texels of a given texture image, the texture cache access control circuitry 54 controls access to the cached texels in the texture cache 46 according to one of a plurality of bank mappings. In at least one operating mode (e.g. a trilinear filtering mode in which the texture filtering circuitry 60 performs trilinear filtering of texels from different mipmaps with parallel reads to the texels in the different mipmaps, although it could also apply to other modes), the selected bank mapping to use for the given chunk of texels is selected according to a selection policy which depends on:

at least one of the first/second chunk position coordinates 84 (chunk u, and/or chunk v) associated with a given chunk; and the at least one further texture attribute 83 associated with a given texture image.

At step 104, the texture mapping circuitry 48 performs texture mapping operations using the cached texels accessed according to the selected bank mapping.

Hence, by selecting the bank mapping not only based on chunk position, but also based on at least one further texture attribute, the texels that a given relative position within the chunk can be allocated to different banks for different texture images to reduce the likelihood that, even if a texture images very small, all of the texels of a set of texture images to be processed end up being allocated to the same bank. This improves performance.

FIGS. 10 to 14 illustrates a number of different examples of further texture attributes 83 which could be used for the bank mapping selection by the texture cache access control circuitry 54.

Figure 10:
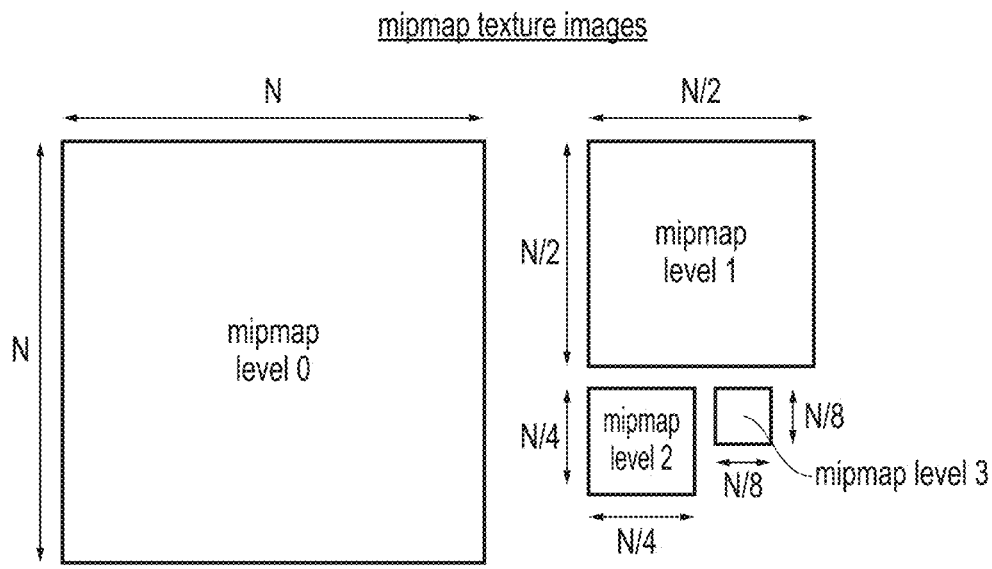
FIG. 10 illustrates use of mipmap texture images.

As shown in FIG. 10, a texture may be defined using a set of mipmap texture images each defining the same texture at different image resolutions. Each mipmap texture image may be assigned a mipmap level, with mipmap level 0 referring to the image at the highest resolution, and each subsequent mipmap level referring to an image which is ¼ of the size of the image at the previous mipmap level (½ the height and ½ the width). This can be useful to allow the number of texels read from memory or the texture cache to be proportionate to the level of detail required for a given surface in the rendered frame. It can be faster to read a small mipmap image than to sample texels from a larger mipmap image, when the level of detail required is low. Hence, when rendering objects far from the viewpoint, it may be common that relatively small mipmaps may be used, which could even be as small as 1×1 or 2×2 texels, making the bank conflicts more likely if the chunk position is the only factor in bank mapping selection as discussed earlier with respect FIG. 8. By considering the mipmap level as the at least one further texture attribute 83 used to select the bank mapping, this allows neighbouring mipmap levels to be assigned different bank mappings for a given chunk position within the mipmap image, so that when performing trilinear filtering of texels from neighbouring mipmaps, the texels can more frequently be read in parallel because they are assigned to different banks. Although varying bank mapping based on mipmap level can be particularly useful in the trilinear filtering mode, it could also help to improve performance in other operating modes which use mipmap images, as even in such modes other than trilinear filtering mode there can be occasions when the relatively small mipmaps are desired to be accessed in parallel and so reducing frequency of bank conflicts can be beneficial.

Figure 11:
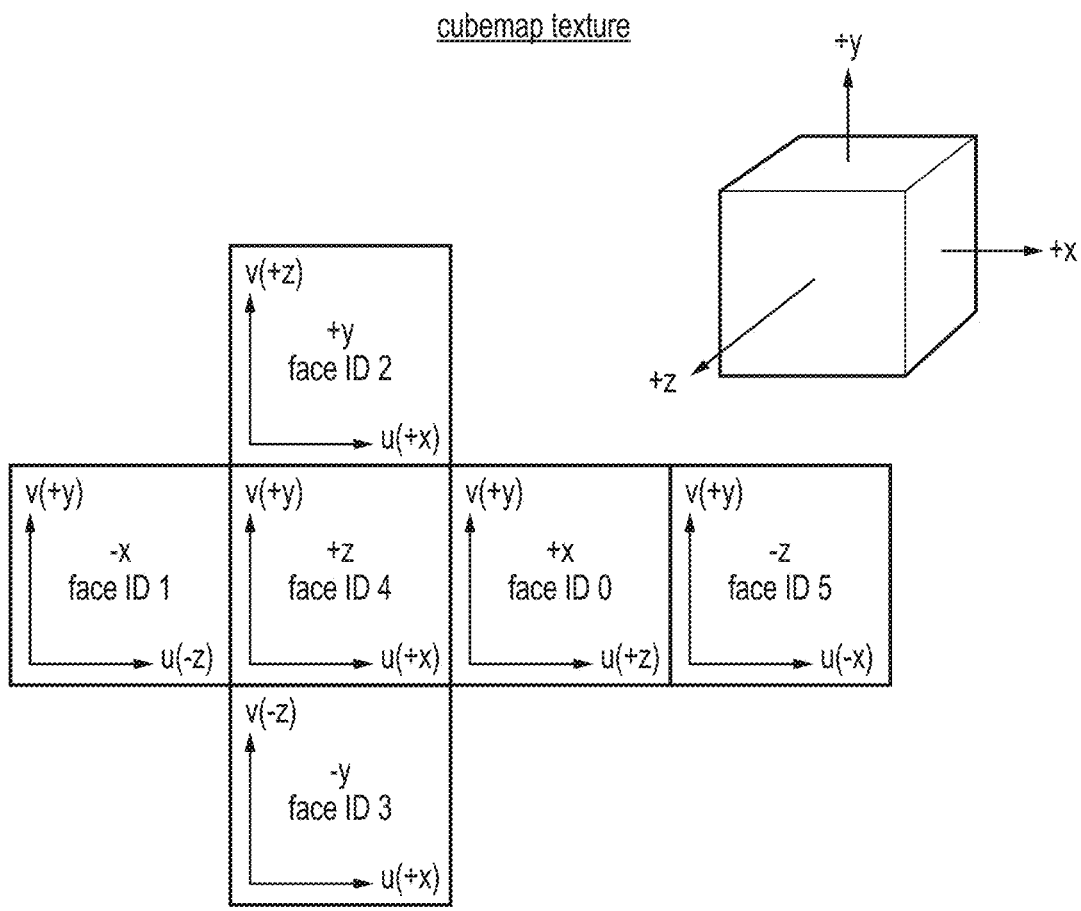
FIG. 11 illustrates cube mapping.

FIG. 11 illustrates an example of cube mapping, where a set of cubemap texture images is defined, representing textures to be applied to the 6 internal faces of a cube. The cube "net" shown in the left hand part of FIG. 11 shows the format of the texture images defined in memory, which are represented as flat images with each cube face having a different mapping between the texture axes u, v and the frame axes x, y, z as shown to simulate "folding up" of the cube to form a three-dimensional cube as shown in the right hand part of FIG. 11. Hence, 6 cube faces are provided to represent views in the +x, −x, +y, −y, +z, −z directions respectively, Each face texture image is assigned a face identifier to distinguish it from the other face texture images of the cubemap texture. It is common for the face identifiers 0 to 5 to represent the +x, −x, +y, −y, +z, −z respectively, although other face identifier mappings could also be used. At edges of the cube, it may be useful for image quality to perform filtering using texels from the adjacent faces meeting at that edge. However, for certain cube edges, if the texels to be blended together have similar chunk position coordinates, there may be a risk that the same bank mapping is used in both face images at the corresponding chunk positions, and this ends up with the texels needing to be blended together all being in the same bank so that it takes more cycles to read them. Hence, by using the face identifier as the further texture attribute 83 used to select bank mappings, this can reduce the likelihood of bank conflicts when processing cubemap textures.

Figure 12:
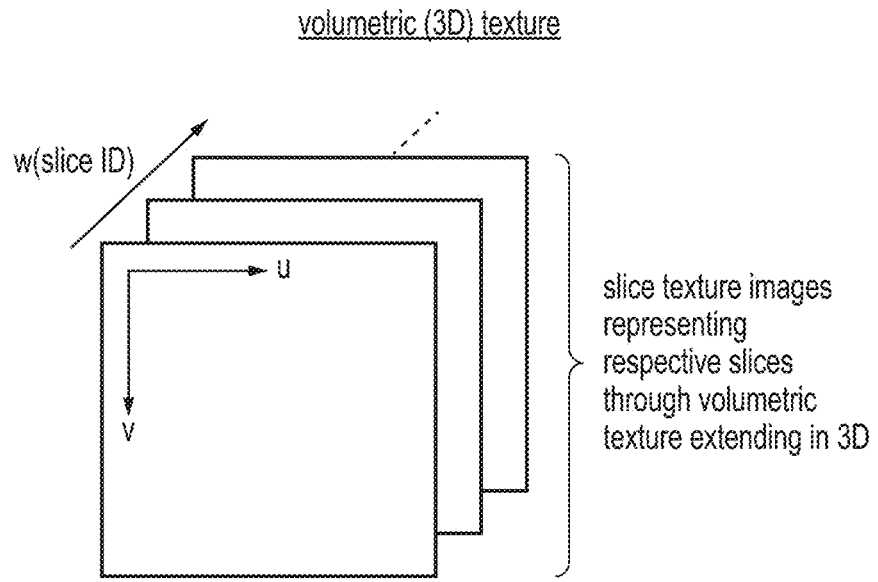
FIG. 12 illustrates a volumetric texture.

FIG. 12 illustrates an example of a volumetric texture which represents a texture to be applied to a three-dimensional region of space. This can be useful for defining textures of three-dimensional non-solid objects occupying a region of space such as clouds, fog, smoke, etc. The volumetric texture is represented as a series of two-dimensional texture images each representing a slice through the volumetric texture. Hence, each slice texture image may be assigned a slice identifier representing the position of the slice along a third texture axis w orthogonal to the first and second texture axes u, v used for ordinary 2D textures. To provide smooth image appearance when scaling the texture to different sizes in a rendered scene, blending may be performed between texels in adjacent slices and so again there may be a risk of bank conflicts causing loss of performance if the texels that are at corresponding positions in different slices are in the same bank of cache storage 70. Therefore, it can be useful to use the slice identifier as the further attribute 83 for selecting the bank mapping to use, when processing volumetric textures.

Figure 13:
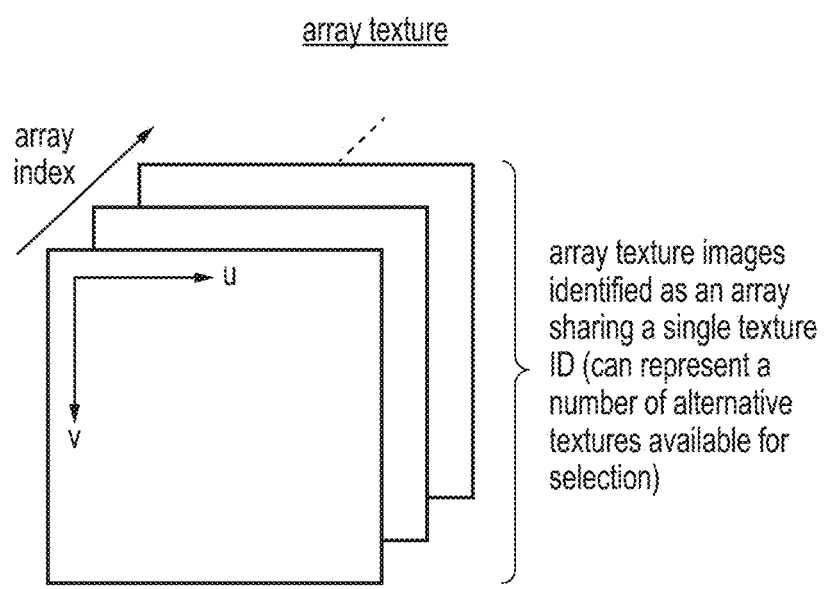
FIG. 13 illustrates an array texture.

FIG. 13 illustrates an array texture defined as an array of 2D texture images, with an array index distinguishing the different texture images of the array. The array is defined using a single texture ID 81. While FIG. 13 may look similar to FIG. 12 for the volumetric texture, a difference is that while the slices of the volumetric texture are intended to collectively represent a three-dimensional texture, with the array texture each two-dimensional array texture image is essentially independent and represents an alternate texture available for selection by the user for a given object to be textured. The array essentially provides a menu of texture options which can be selected by indicating the appropriate array index to be used. Managing a set of alternate textures as an array can be helpful to improve ease of programming, for example. By using the array index as the further texture attribute 83 for selecting the bank mapping, this can help to distribute texels storage across the banks to a greater extent, which can help to make bank conflicts less likely and therefore improve performance, particularly when relatively small texture images are being processed.

Figure 14:
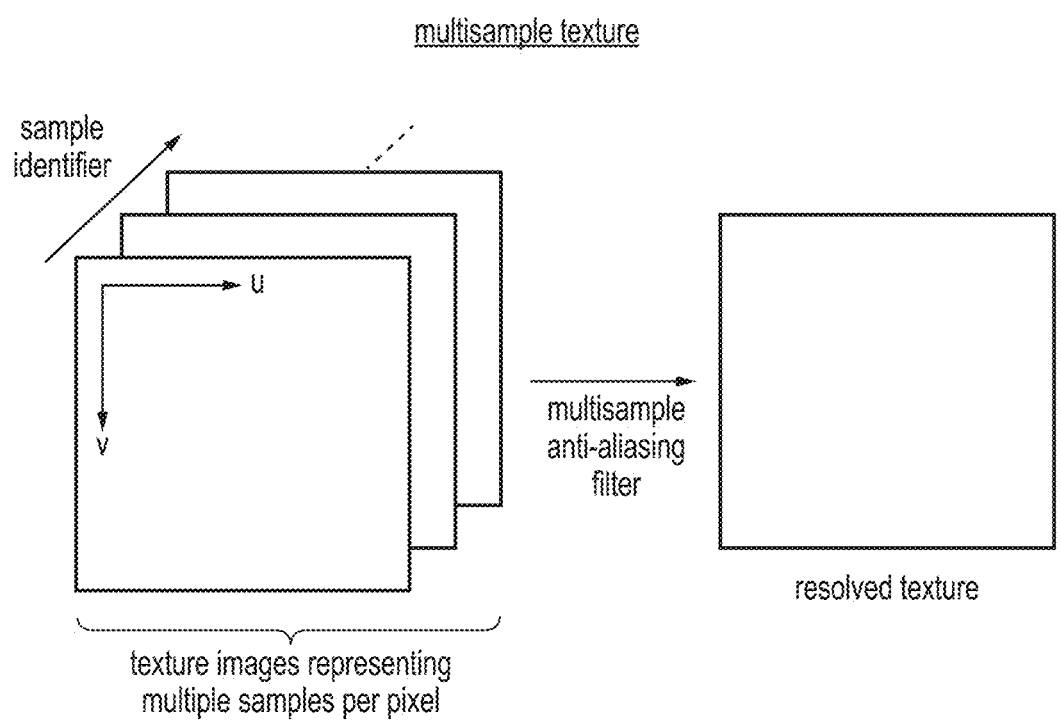
FIG. 14 illustrates a multi-sample texture.

FIG. 14 illustrates a multi-sample texture which is defined using a number of sample texture images which represent multiple samples for each pixel position to which texturing is to be applied. The different sample texture images collectively simulate sampling at higher resolution, and blending these in a multi-sample anti-aliasing filter can be helpful to reduce jagged edges caused by aliasing effects for linear features which are oriented diagonally relative to the pixel grid. As it is common that the texels of the different sample images to be blended together will be at corresponding texel positions, this means that if each sample image is processed using the same bank mapping then it is relatively likely that there will be bank conflicts during the readouts for the multi-sample anti-aliasing process. By using the sample identifier as the further texture attribute 83 for controlling bank mapping selection, this helps to distribute the accesses over the banks and reduce the probability of bank conflicts, improving performance.

Hence, FIGS. 15 to 19 illustrate various examples of bank mapping selection based on chunk position and a further texture attribute 83. In each case, the steps shown are performed at the point when a given chunk of texels derived from a given texture image is either to be written to the texture cache 46 having been fetched from memory (and possibly decompressed or subject to other reformatting operations) or to be read from the texture cache 46 ready for filtering or other texture mapping operations being performed by the texture mapping circuitry 48.

Figure 15:
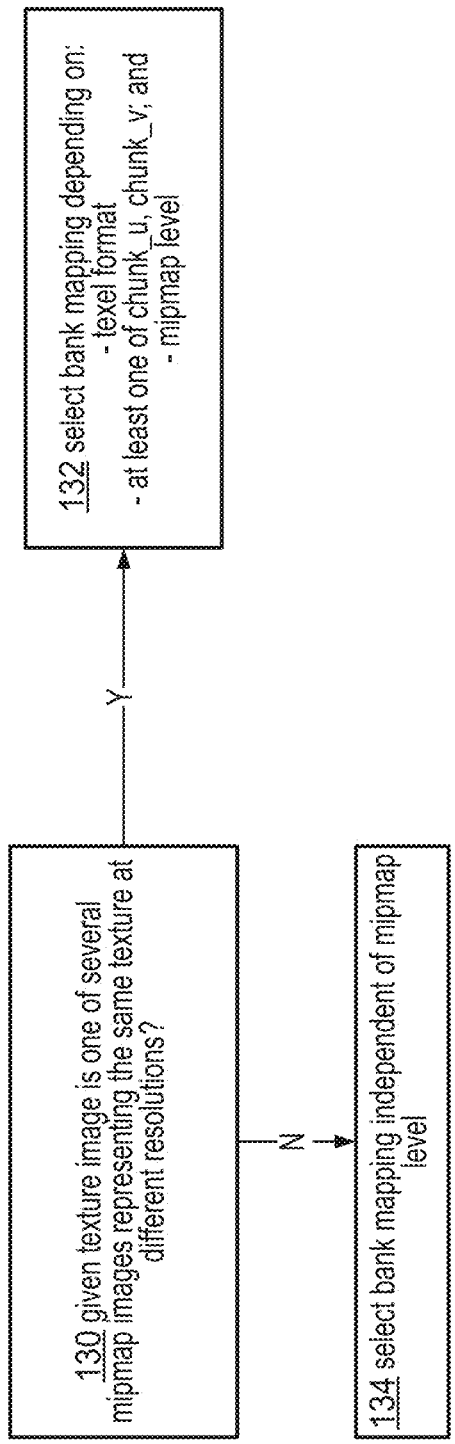

FIG. 15 shows an example where the further texture attribute 83 is the mipmap level. At step 130, the texture cache access control circuitry 54 determines whether the given texture image is one of several mipmap images representing the same texture at different resolutions. If so, then at step 132, the bank mapping to be used is selected depending on the texel format being processed, at least one of the first and second chunk position coordinates chunk_u, chunk_v of the given chunk of texels to be read or written in the cache 46, and the mipmap level associated with the given texture image from which the given chunk of texels was derived. This approach can provide a significant performance benefit especially when the current operating mode of the texture mapper 44 is a trilinear filtering mode which performs parallel reads to different mipmap images, as such mode may be more likely to access neighbouring mipmap levels of the same texture image in parallel. However, this approach can also help with other types of filtering mode which do not use trilinear filtering. If the given texture image is not part of a texture defined using mipmaps, then at step 134 the bank mapping is selected independent of the mipmap level.

Figure 16:
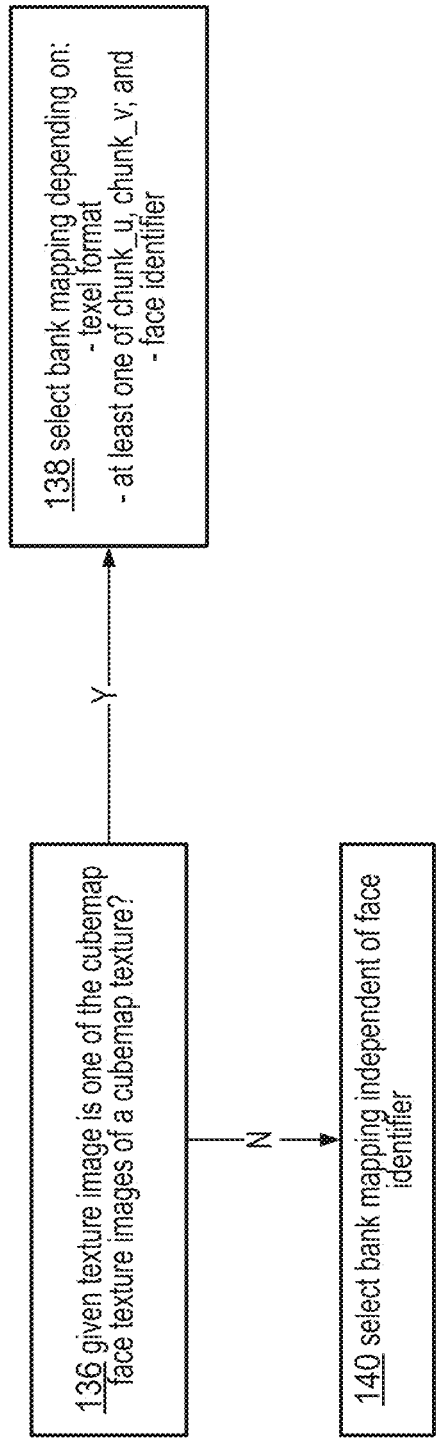

FIG. 16 shows an example where the further texture attribute 83 is the face identifier of a cubemap texture image. At step 136, the texture cache access control circuitry 54 determines whether the given texture image is one of several cubemap face texture images representing the respective faces of a cubemap texture. If so, then at step 138, the bank mapping to be used is selected depending on the texel format being processed, at least one of the first and second chunk position coordinates chunk_u, chunk_v of the given chunk of texels to be read or written in the cache 46, and the face identifier associated with the given texture image from which the given chunk of texels was derived. If the given texture image is not part of a cubemap texture, then at step 140 the bank mapping is selected independent of the face identifier.

FIG. 17 shows an example where the further texture attribute 83 is the slice identifier of a volumetric texture image. At step 142, the texture cache access control circuitry 54 determines whether the given texture image is one of several slice texture images of a volumetric texture representing a texture extending in space in three dimensions. If so, then at step 144, the bank mapping to be used is selected depending on the texel format being processed, at least one of the first and second chunk position coordinates chunk_u, chunk_v of the given chunk of texels to be read or written in the cache 46, and the slice identifier associated with the given texture image from which the given chunk of texels was derived. If the given texture image is not part of a volumetric texture, then at step 146 the bank mapping is selected independent of the slice identifier.

FIG. 18 shows an example where the further texture attribute 83 is the array index of an array texture image. At step 148, the texture cache access control circuitry 54 determines whether the given texture image is one of several array texture images defined as an array sharing a single texture identifier. If so, then at step 150, the bank mapping to be used is selected depending on the texel format being processed, at least one of the first and second chunk position coordinates chunk_u, chunk_v of the given chunk of texels to be read or written in the cache 46, and the array index associated with the given texture image from which the given chunk of texels was derived. If the given texture image is not part of an array texture, then at step 152 the bank mapping is selected independent of the array index.

Figure 19:
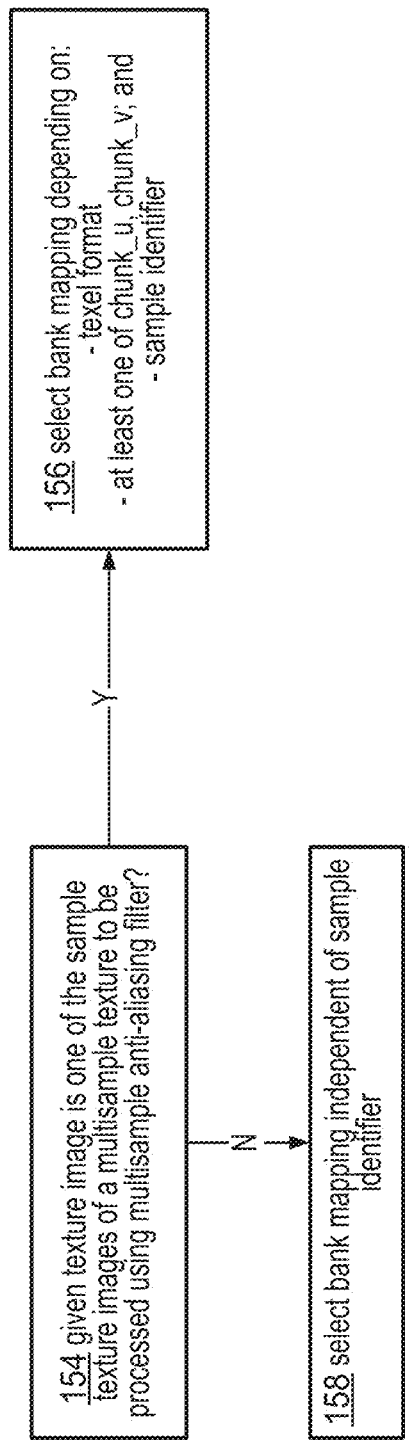

FIG. 19 shows an example where the further texture attribute 83 is the sample identifier of a sample texture image used for multi-sample anti-aliasing. At step 154, the texture cache access control circuitry 54 determines whether the given texture image is one of several sample texture images representing multiple samples for the same texel/pixel positions to be processed using a multi-sample anti-aliasing filter. If so, then at step 156, the bank mapping to be used is selected depending on the texel format being processed, at least one of the first and second chunk position coordinates chunk_u, chunk_v of the given chunk of texels to be read or written in the cache 46, and the sample identifier associated with the given texture image from which the given chunk of texels was derived. If the given texture image is not part of a multi-sample texture, then at step 158 the bank mapping is selected independent of the sample identifier.

These are just some examples of possible texture attributes 83 that can be used for the bank mapping selection. Other attributes could also be used.

Figure 20:
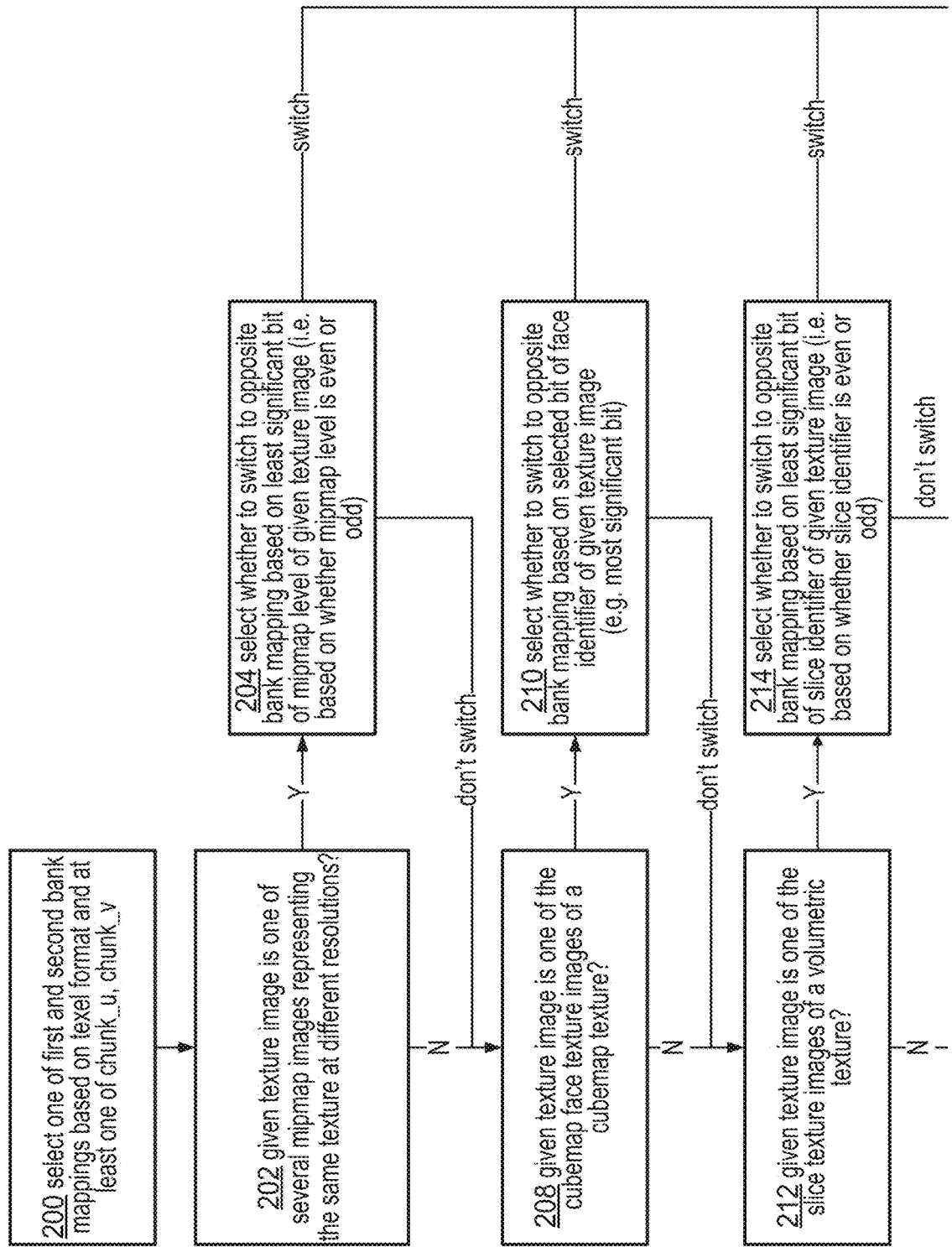
FIG. 20 illustrates a specific example of selecting the bank mapping based on multiple further texture attributes.
Figure 20:
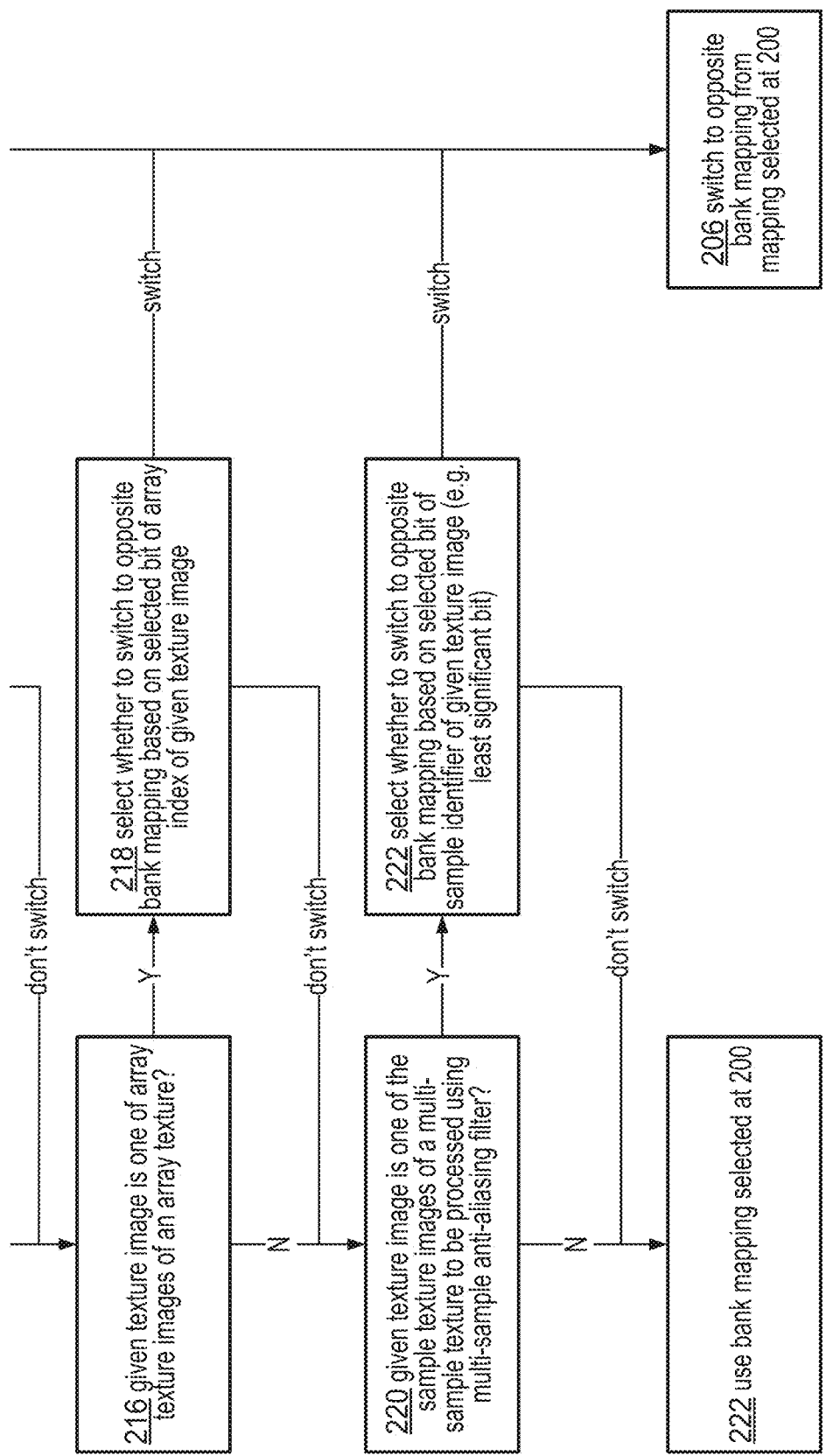

FIG. 20 illustrates a specific example illustrating how bank mapping selection could combine more than one further texture attribute 83, in addition to any dependence on texel format and chunk position coordinate. This example uses only two bank mappings as in the example of FIG. 8. Of course, there could be more than two bank mappings in other examples.

At step 200, the texture cache access control circuitry 54 selects, for a given chunk of texels of a given texture image, one of first and second bank mappings based on the texel format and at least one of the first and second chunk position coordinates, chunk_u, chunk_v, representing the position of the given chunk of texels within the given texture image. Hence, a default bank mapping selected based on the texel format and at least one chunk position coordinate. In subsequent steps, a decision is made on whether to switch from the default bank mapping to an alternate (opposite) bank mapping based on the further texture attributes 83.

At step 202, the texture cache access control circuitry 54 determines whether the given texture image is one of several mipmap images representing the same texture at different resolutions. If so, then at step 204, the texture cache access control circuitry 54 selects whether to switch to the opposite bank mapping based on a least significant bit of the mipmap level of the given texture image. The texture cache access control circuitry 54 switches the bank mapping if the least significant bit has a first value (one of 0 and 1) and does not switch the bank mapping if the least significant bit has a second value (the other of 0 and 1). Hence, odd-numbered mipmap levels will use one bank mapping and even-numbered mipmap levels will use the other bank mapping. By determining whether to switch the bank mapping based on the least significant bit, this means that any two neighbouring mipmap levels will use different bank mappings which tends to improve performance because it is most common to read texels from neighbouring mipmap levels in parallel when performing trilinear filtering. Hence, if the texture cache access control circuitry 54 determines, based on the least significant bit of the mipmap level, that the bank mapping should be switched, then at step 206 the texture cache access control circuitry 54 switches the selected bank mapping to be the opposite bank mapping from the one selected at step 200. The opposite bank mapping is then used for accessing the cache for the given chunk of texels of the given texture image. If at step 204 the texture cache access control circuitry 54 determines not to switch the bank mapping, then the mipmap-level-based check at steps 202 and 204 does not cause the bank mapping selected at step 200 to be changed.

At step 208, the texture cache access control circuitry 54 determines whether the given texture image is one of several cubemap face texture images representing respective internal faces of a cubemap texture. If so, then at step 210 the texture cache access control circuitry 54 selects whether to switch to the opposite bank mapping based on a selected bit of the face identifier of the given texture image. Texels from opposite faces of the cube are unlikely to be blended together so can use the same bank mapping. This leaves three pairs of opposing cube faces. However, in the example of FIG. 20 only two bank mappings are supported by the texture cache access control circuitry 54 to limit wiring congestion and control circuit logic complexity. Therefore, a relatively simple approach to allocate the two bank mappings to the respective cube faces can be to use a selected bit of the face identifiers to control whether to switch from the default bank mapping selected at step 200 to the opposite bank mapping. With the face identifier mapping scheme shown in FIG. 11 with face identifiers extending from 0 to 5, each face identifier can be represented using a 3-bit value. If the most significant bit is used to select whether to switch the bank mapping, then chunks of texels from the +z and −z face texture images (represented with face identifiers 100 and 101 respectively) would use a different bank mapping to the +x, −x, +y, −y face texture images (represented with face identifiers 000, 001, 010 and 011 respectively). If the middle bit of the 3-bit face identifier is used to select whether to switch the bank mapping, then chunks from the +y and −y faces would use a different bank mapping to chunks of texels from the +x, −x, +z, −z face texture images. Which approach is best may depend on the way in which the chunk position coordinates are used to select the default bank mapping. For example, if the default bank mapping is selected at step 200 based on chunk v (independent of chunk u), then it can be seen from the definition of the u, v axes in the respective faces as shown in FIG. 11 that texels either side of the −x/+z, +z/+x, +x/−z and −z/−x edges (which are likely to be read out for blending together in a filtering operation to smooth any artefacts visible at the cube boundaries) will all share the same chunk_v position coordinate and so be mapped to the same bank in the default bank mapping. In this case, performance can be improved to the greatest extent by switching the bank mapping based on the most significant bit of the face identifier (so that chunks of texels at a given chunk_v position in the −z and +z face texture images are allocated a different bank mapping to chunks of texels at corresponding positions in the +x, −x, +y, −y face texture images). However, it will be appreciated that for other implementations which use a different scheme for selecting the default bank mapping based on chunk position, it may be better to use a different bit of the face identifier to select which bank mapping to use. Also, other examples may use a different mapping between face identifiers and cube faces and this may also lead to a different way of using the face identifier to select the bank mapping.

Hence, if the texture cache access control circuitry 54 determines, based on the selected bit of the face identifier, that the bank mapping should be switched, then at step 206 the texture cache access control circuitry 54 switches the selected bank mapping to be the opposite bank mapping from the one selected at step 200. The opposite bank mapping is then used for accessing the cache for the given chunk of texels of the given texture image. If at step 210 the texture cache access control circuitry 54 determines not to switch the bank mapping, then the cubemap-face-identifier-based check at steps 208 and 210 does not cause the bank mapping selected at step 200 to be changed.

At step 212, the texture cache access control circuitry 54 determines whether the given texture image is one of several slice texture images representing respective slices through a volumetric texture. If so, then at step 214 the texture cache access control circuitry 54 selects whether to switch to the opposite bank mapping based on the least significant bit of the slice identifier of the given texture image. Again, this has the effect that slice texture images with odd-numbered slice identifiers will use one bank mapping and slice texture images with even-numbered slice identifiers will use the other bank mapping. This is useful because the most common slices to be blended together will be neighbouring slices through the volumetric texture. If the texture cache access control circuitry 54 determines, based on the least significant bit of the slice identifier, that the bank mapping should be switched, then at step 206 the texture cache access control circuitry 54 switches the selected bank mapping to be the opposite bank mapping from the one selected at step 200. The opposite bank mapping is then used for accessing the cache for the given chunk of texels of the given texture image. If at step 214 the texture cache access control circuitry 54 determines not to switch the bank mapping, then the slice-identifier-based check at steps 212 and 214 does not cause the bank mapping selected at step 200 to be changed.

At step 216, the texture cache access control circuitry 54 determines whether the given texture image is one of several array texture images representing a set of textures identified using an array structure sharing a single texture identifier. If so, then at step 218 the texture cache access control circuitry 54 selects whether to switch to the opposite bank mapping based on a selected bit of the array index of the given texture image. The selected bit of the array index could be any bit of the array index. If the texture cache access control circuitry 54 determines, based on the selected bit of the array index, that the bank mapping should be switched, then at step 206 the texture cache access control circuitry 54 switches the selected bank mapping to be the opposite bank mapping from the one selected at step 200. The opposite bank mapping is then used for accessing the cache for the given chunk of texels of the given texture image. If at step 218 the texture cache access control circuitry 54 determines not to switch the bank mapping, then the array-index-based check at steps 216 and 218 does not cause the bank mapping selected at step 200 to be changed.

At step 220, the texture cache access control circuitry 54 determines whether the given texture image is one of several sample texture images representing a multi-sample texture to be processed using a multi-sample anti-aliasing filter. If so, then at step 222 the texture cache access control circuitry 54 selects whether to switch to the opposite bank mapping based on a selected bit of the sample identifier of the given texture image. Any bit of the sample identifier could be used to select the bank mapping, although as it is relatively likely that a multi-sample anti-aliasing filter could process the samples in order of sample identifier, performance may be best if the selected bit is the least significant bit of the sample identifier, as it may be more likely that reads to the texture cache during processing of the multi-sample anti-aliasing filter may attempt to read texels from samples with neighbouring sample identifier values in parallel. Hence, it can be useful to use the least significant bit of the sample identifier to select the bank mapping so that texels at corresponding positions in sample texture images with odd-numbered and even-numbered sample identifiers are given different bank mappings. Nevertheless, another bit of the sample identifier could also be used. If the texture cache access control circuitry 54 determines, based on the selected bit of the sample identifier, that the bank mapping should be switched, then at step 206 the texture cache access control circuitry 54 switches the selected bank mapping to be the opposite bank mapping from the one selected at step 200. The opposite bank mapping is then used for accessing the cache for the given chunk of texels of the given texture image. If at step 222 the texture cache access control circuitry 54 determines not to switch the bank mapping, then the sample-identifier-based check at steps 220 and 222 does not cause the bank mapping selected at step 200 to be changed.

Hence, if none of the checks at steps 204, 210, 214, 218, 222 changes the bank mapping, then at step 222 the bank mapping to use for the given chunk of texels remains as the default bank mapping selected at step 200.

It will be appreciated that it is not essential for all of the types of checks shown in FIG. 20 to be implemented. Any one, two or more of the five different checks based on further texture attributes 83 at steps 202/204, 208/210, 212/214, 216/218 or 220/222 could be implemented. Also, while FIG. 20 shows the steps as a sequential flow diagram, it will be appreciated that these steps could be performed in a different order, or at least partially in parallel. For example, if two or more of the checks at steps 202/204, 208/210, 212/214, 216/218 and 220/222 are implemented, then these checks could be performed in parallel with the result of each check combined in a logical OR or XOR operation to determine whether the default bank mapping should be switched.

For example, an implementation which implements only the mipmap-level and cubemap face identifier checks at steps 202/024 and 208/210 could function as follows:

```
if (is_cubemap){
    if (face_index < 4){
        face_index_ABM = 1
    } else{
        face_index_ABM = 0
    }
} else{
    face_index_ABM = 0
}
ABM_en = face_index_ABM ^ mip_level_bit_0.
```

When "ABM_en" is asserted, the default bank mapping selected based on texel format and chunk position is switched to the opposite bank mapping. If ABM_en remains unasserted (=0) then the default bank mapping selected based on texel format and chunk position is used. If further checks of other types of texture identifier are to be implemented as well, the results of those checks can also be included as further terms ORed together to produce ABM_en, so that the bank mapping switches if at least one check determines that the bank mapping should be switched.

Another approach could be to use a logical XOR of the different check results to determine whether the bank mapping is swapped, so that if an even number of checks return 1 ("switch bank mappings") then the bank mapping is not swapped from the default approach, while if an odd number of checks return 1 then the bank mapping is swapped. This can give a more balanced probability for swapping or not swapping, in contrast to OR which would give a higher probability for swapping. By providing probability for swapping or not swapping that is closer to 0.5, this will tend to distribute the bank accesses over different banks more effectively and hence reduce the likelihood of bank conflicts.

Also, while FIG. 20 shows an implementation with only two bank mappings supported, other examples could support more than two bank mappings. In this case, step 206 of FIG. 20 can be modified so that, instead of switching to the opposite bank mapping from the one selected at step 200, at step 206 the texture cache access control circuitry 54 switches to the next bank mapping in a cyclic sequence of bank mappings. For example, if the cyclic sequence defines three bank mappings in a sequence 0, 1, 2, 0, 1, 2, etc., then if bank mapping 0 is selected at step 200, step 206 would select bank mapping 1; if bank mapping 1 is selected at step 200, step 206 would select bank mapping 2; and if bank mapping 2 is selected at step 200, step 206 would select bank mapping 0. Hence, FIG. 20 could be extended to handle more than two bank mappings.

Another approach to selecting from among multiple bank mappings can be to implement a hash function which takes as inputs the texture attributes (first and second chunk coordinates and one or more of: mipmap level, face identifier, slice identifier, array index and/or sample identifier) and produces the bank mapping index as output. A good hash function for this would ensure that texture images typically accessed in parallel use different bank mappings. It is also preferable for the hash function to use each available mapping with an approximately equal probability (to increase the extent to which cache accesses are distributed across banks and hence reduce frequency of bank conflicts).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Examples of the disclosure are set out in the following clauses:

(1) An apparatus, comprising:
   texture mapping circuitry to perform texture mapping operations using texels defined by textures represented using at least one texture image stored in a memory system;
   a texture cache comprising a plurality of banks of cache storage to cache texels for processing in the texture mapping operations; and
   texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
   in at least one operating mode, the texture cache access control circuitry is configured to select the selected bank mapping for the given chunk of texels of the given texture image depending on:
      at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
      at least one further texture attribute associated with the given texture image.

(2) The apparatus according to clause (1), in which:
   in a first bank mapping of the plurality of bank mappings, a texel at a given position within the given chunk is mapped to a first bank of cache storage of the texture cache; and
   in a second bank mapping of the plurality of bank mappings, the texel at the given position within the given chunk is mapped to a second bank of cache storage of the texture cache different from the first bank.

(3) The apparatus according to any of clauses (1) and (2), in which the at least one further texture attribute comprises an attribute indicating which of a plurality of texture images of a multi-image texture is the given texture image.

(4) The apparatus according to any preceding clause, in which, when the given texture image is one of a plurality of mipmap texture images representing a same texture at different resolutions, the at least one further texture attribute comprises a mipmap level associated with the given texture image, the mipmap level identifying which of the plurality of mipmap texture images is the given texture image.

(5) The apparatus according to clause (4), in which the texture cache access control circuitry is configured to select the selected bank mapping for the given chunk of texels based on the mipmap level, to cause different bank mappings to be used for chunks of texels at corresponding positions within mipmap texture images at neighbouring mipmap levels.

(6) The apparatus according to clause (4) or (5), in which said at least one operating mode comprises a trilinear filtering mode in which the texture mapping circuitry is configured to perform trilinear filtering using cached texels of different mipmap texture images read in parallel from the texture cache.

(7) The apparatus according to any preceding clause, in which, when the given texture image is one of a plurality of cubemap face texture images representing textures of respective faces of a cube, the at least one further texture attribute comprises a face identifier identifying which of the plurality of cubemap face texture images is the given texture image.

(8) The apparatus according to clause (7), in which, for at least one edge of the cube at which first and second faces represented by first and second cubemap face texture images meet, the texture cache access control circuitry is configured to select different bank mappings to be used for chunks at corresponding positions within the first and second cubemap face texture images.

(9) The apparatus according to any preceding clause, in which, when the given texture image is one of a plurality of slice texture images representing respective slices through a volumetric texture extending in three dimensions, the at least one further texture attribute comprises a slice identifier identifying which of the slice texture images is the given texture image.

(10) The apparatus according to clause (9), in which the texture cache access control circuitry is configured to select the selected bank mapping for the given chunk of texels based on the slice identifier, to cause different bank mappings to be used for chunks of texels at corresponding positions within neighbouring slice texture images of the volumetric texture.

(11) The apparatus according to any preceding clause, in which, when the given texture image is one of a plurality of array texture images of an array texture identified as an array using a single texture identifier, the at least one further texture attribute comprises an array index identifying which of the plurality of array texture images is the given texture image.

(12) The apparatus according to any preceding clause, in which, when the given texture image is one of a plurality of sample texture images of a multisample texture to be processed using multisample anti-aliasing, the at least one further texture attribute comprises a sample identifier identifying which of the plurality of sample texture images is the given texture image.

(13) The apparatus according to any preceding clause, in which the texture cache access control circuitry is also configured to select the selected bank mapping for the given chunk of texels depending on a texture format used to store a corresponding texture in the memory system.

(14) The apparatus according to any preceding clause, in which the texture cache access control circuitry is configured to support two bank mappings.

(15) The apparatus according to any preceding clause, comprising a graphics processing unit (GPU), the GPU comprising the texture mapping circuitry, the texture cache and the texture cache access control circuitry.

(16) A method comprising:
- caching texels, defined by textures represented using at least one texture image stored in a memory system, in a texture cache comprising a plurality of banks of cache storage;
- for cached texels corresponding to a given chunk of texels of a given texture image, controlling access to the cached texels in the texture cache according to a selected bank mapping selected from among a plurality of bank mappings, each bank mapping corresponding to a different mapping of the respective texels of the given chunk of texels to the plurality of banks of cache storage of the texture cache; and
- performing texture mapping operations using cached texels obtained from the texture cache; in which:
- in at least one operating mode, the selected bank mapping to use for the given chunk of texels of the given texture image is selected depending on:
  - at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
  - at least one further texture attribute associated with the given texture image.

(17) A non-transitory computer-readable medium to store computer-readable code for fabrication of an apparatus comprising:
- texture mapping circuitry to perform texture mapping operations using texels defined by textures represented using at least one texture image stored in a memory system;
- a texture cache comprising a plurality of banks of cache storage to cache texels for processing in the texture mapping operations; and
- texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
- in at least one operating mode, the texture cache access control circuitry is configured to select the selected bank mapping for the given chunk of texels of the given texture image depending on:
  - at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
  - at least one further texture attribute associated with the given texture image.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
- texture mapping circuitry to perform texture mapping operations using texels defined by textures represented using at least one texture image stored in a memory system;
- a texture cache comprising a plurality of banks of cache storage to cache texels for processing in the texture mapping operations; and
- texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
- in at least one operating mode, the texture cache access control circuitry is configured to select the selected bank mapping for the given chunk of texels of the given texture image depending on:
  - at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
  - at least one further texture attribute associated with the given texture image.

2. The apparatus according to claim 1, in which:
- in a first bank mapping of the plurality of bank mappings, a texel at a given position within the given chunk is mapped to a first bank of cache storage of the texture cache; and
- in a second bank mapping of the plurality of bank mappings, the texel at the given position within the given chunk is mapped to a second bank of cache storage of the texture cache different from the first bank.

3. The apparatus according to claim 1, in which the at least one further texture attribute comprises an attribute indicating which of a plurality of texture images of a multi-image texture is the given texture image.

4. The apparatus according to claim 1, in which, when the given texture image is one of a plurality of mipmap texture images representing a same texture at different resolutions, the at least one further texture attribute comprises a mipmap level associated with the given texture image, the mipmap level identifying which of the plurality of mipmap texture images is the given texture image.

5. The apparatus according to claim 4, in which the texture cache access control circuitry is configured to select the selected bank mapping for the given chunk of texels based on the mipmap level, to cause different bank mappings to be used for chunks of texels at corresponding positions within mipmap texture images at neighbouring mipmap levels.

6. The apparatus according to claim 4, in which said at least one operating mode comprises a trilinear filtering mode in which the texture mapping circuitry is configured to perform trilinear filtering using cached texels of different mipmap texture images read in parallel from the texture cache.

7. The apparatus according to claim 1, in which, when the given texture image is one of a plurality of cubemap face texture images representing textures of respective faces of a cube, the at least one further texture attribute comprises a face identifier identifying which of the plurality of cubemap face texture images is the given texture image.

8. The apparatus according to claim 7, in which, for at least one edge of the cube at which first and second faces represented by first and second cubemap face texture images meet, the texture cache access control circuitry is configured to select different bank mappings to be used for chunks at corresponding positions within the first and second cubemap face texture images.

9. The apparatus according to claim 1, in which, when the given texture image is one of a plurality of slice texture images representing respective slices through a volumetric texture extending in three dimensions, the at least one further texture attribute comprises a slice identifier identifying which of the slice texture images is the given texture image.

10. The apparatus according to claim 9, in which the texture cache access control circuitry is configured to select the selected bank mapping for the given chunk of texels based on the slice identifier, to cause different bank mappings to be used for chunks of texels at corresponding positions within neighbouring slice texture images of the volumetric texture.

11. The apparatus according to claim 1, in which, when the given texture image is one of a plurality of array texture images of an array texture identified as an array using a single texture identifier, the at least one further texture attribute comprises an array index identifying which of the plurality of array texture images is the given texture image.

12. The apparatus according to claim 1, in which, when the given texture image is one of a plurality of sample texture images of a multi-sample texture to be processed using multi-sample anti-aliasing, the at least one further texture attribute comprises a sample identifier identifying which of the plurality of sample texture images is the given texture image.

13. The apparatus according to claim 1, in which the texture cache access control circuitry is also configured to select the selected bank mapping for the given chunk of texels depending on a texture format used to store a corresponding texture in the memory system.

14. The apparatus according to claim 1, in which the texture cache access control circuitry is configured to support two bank mappings.

15. The apparatus according to claim 1, comprising a graphics processing unit (GPU), the GPU comprising the texture mapping circuitry, the texture cache and the texture cache access control circuitry.

16. A method comprising:
caching texels, defined by textures represented using at least one texture image stored in a memory system, in a texture cache comprising a plurality of banks of cache storage;
for cached texels corresponding to a given chunk of texels of a given texture image, controlling access to the cached texels in the texture cache according to a selected bank mapping selected from among a plurality of bank mappings, each bank mapping corresponding to a different mapping of the respective texels of the given chunk of texels to the plurality of banks of cache storage of the texture cache; and
performing texture mapping operations using cached texels obtained from the texture cache; in which:
in at least one operating mode, the selected bank mapping to use for the given chunk of texels of the given texture image is selected depending on:
at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
at least one further texture attribute associated with the given texture image.

17. A non-transitory computer-readable medium to store computer-readable code for fabrication of an apparatus comprising:
texture mapping circuitry to perform texture mapping operations using texels defined by textures represented using at least one texture image stored in a memory system;
a texture cache comprising a plurality of banks of cache storage to cache texels for processing in the texture mapping operations; and
texture cache access control circuitry to control access to cached texels corresponding to a given chunk of texels of a given texture image according to a selected bank mapping selected from among a plurality of bank mappings supported by the texture cache access control circuitry, each bank mapping corresponding to a different mapping of the respective texels within the given chunk of texels to the plurality of banks of cache storage of the texture cache; and
in at least one operating mode, the texture cache access control circuitry is configured to select the selected bank mapping for the given chunk of texels of the given texture image depending on:
at least one of a first chunk position coordinate and a second chunk position coordinate associated with the given chunk of texels, where the first chunk position coordinate is indicative of a position of the given chunk of texels within the given texture image with respect to a first texture axis, and the second chunk position coordinate is indicative of a position of the given chunk of texels within the given texture image with respect to a second texture axis; and
at least one further texture attribute associated with the given texture image.

* * * * *